March 9, 1937. P. B. RENFREW ET AL 2,073,026
LIQUID PURIFYING APPARATUS AND PROCESS
Filed March 4, 1932 18 Sheets-Sheet 5
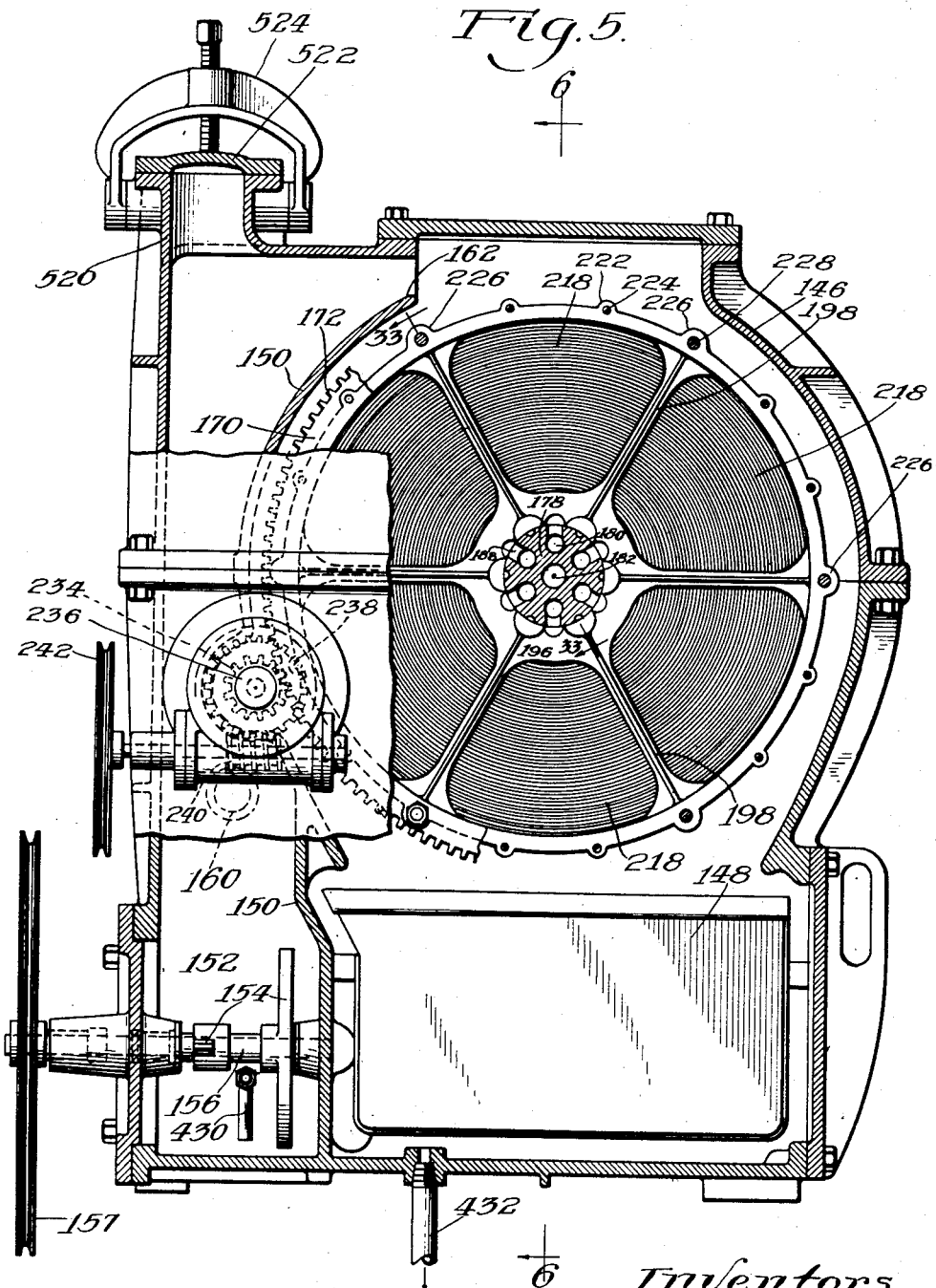

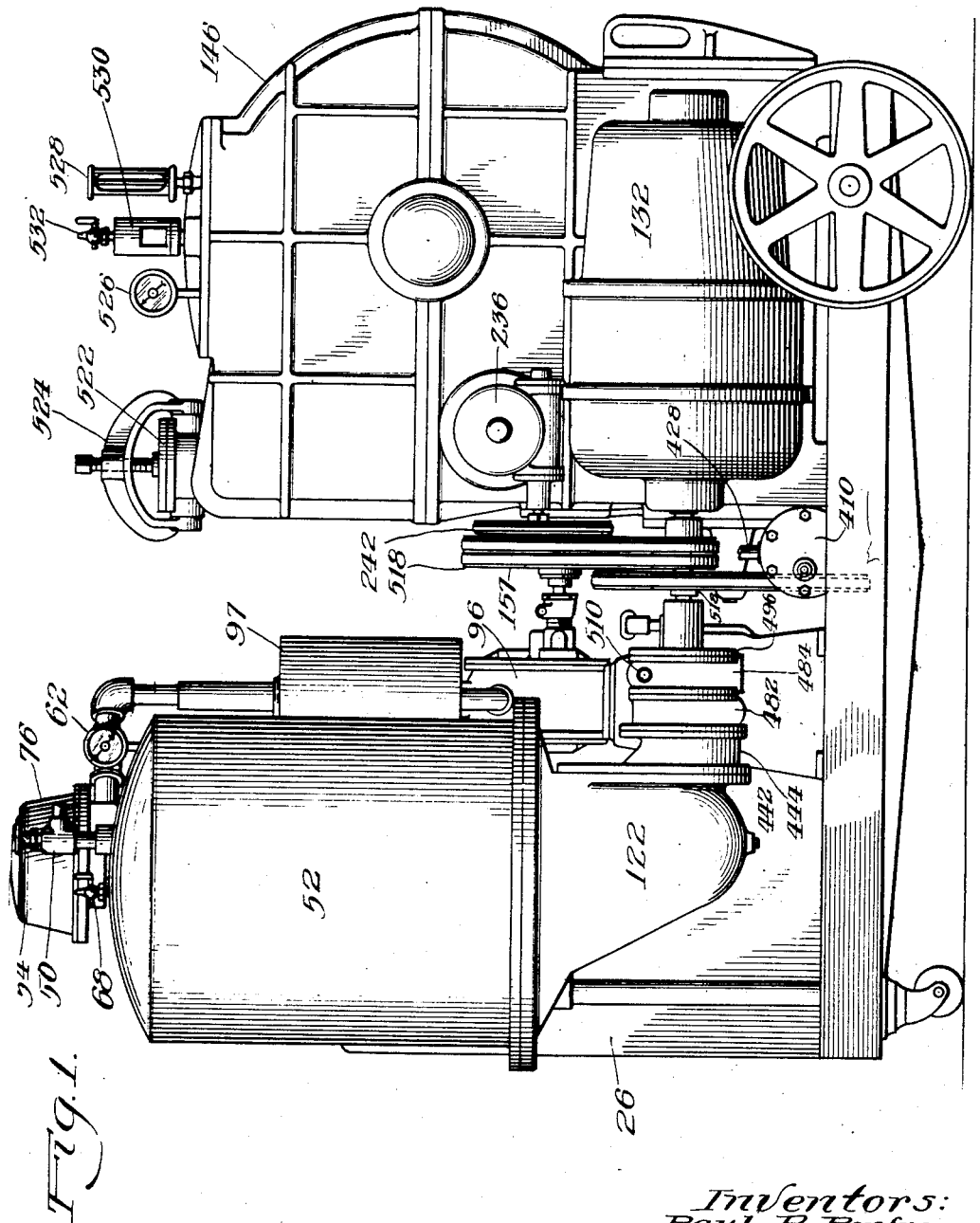

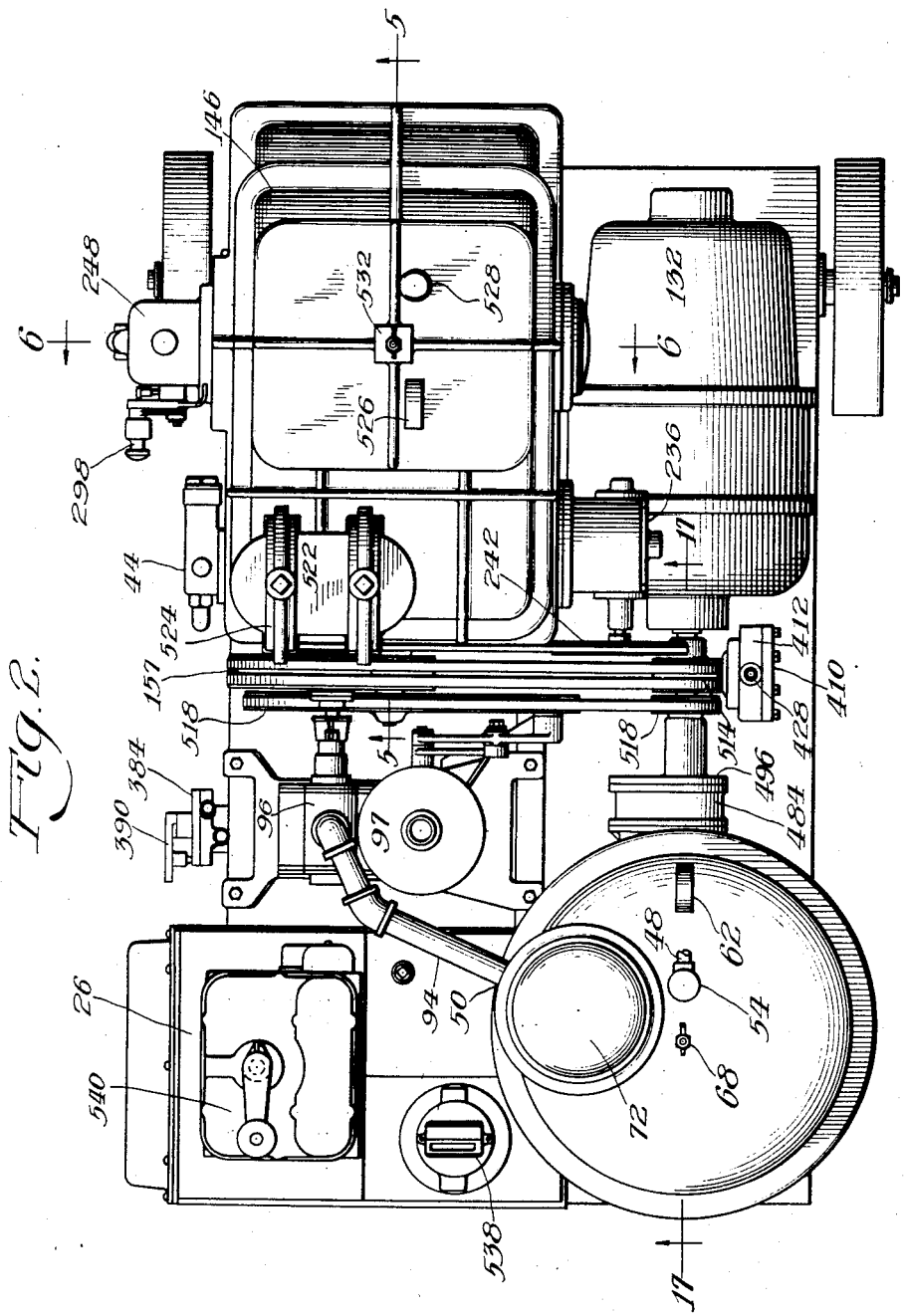

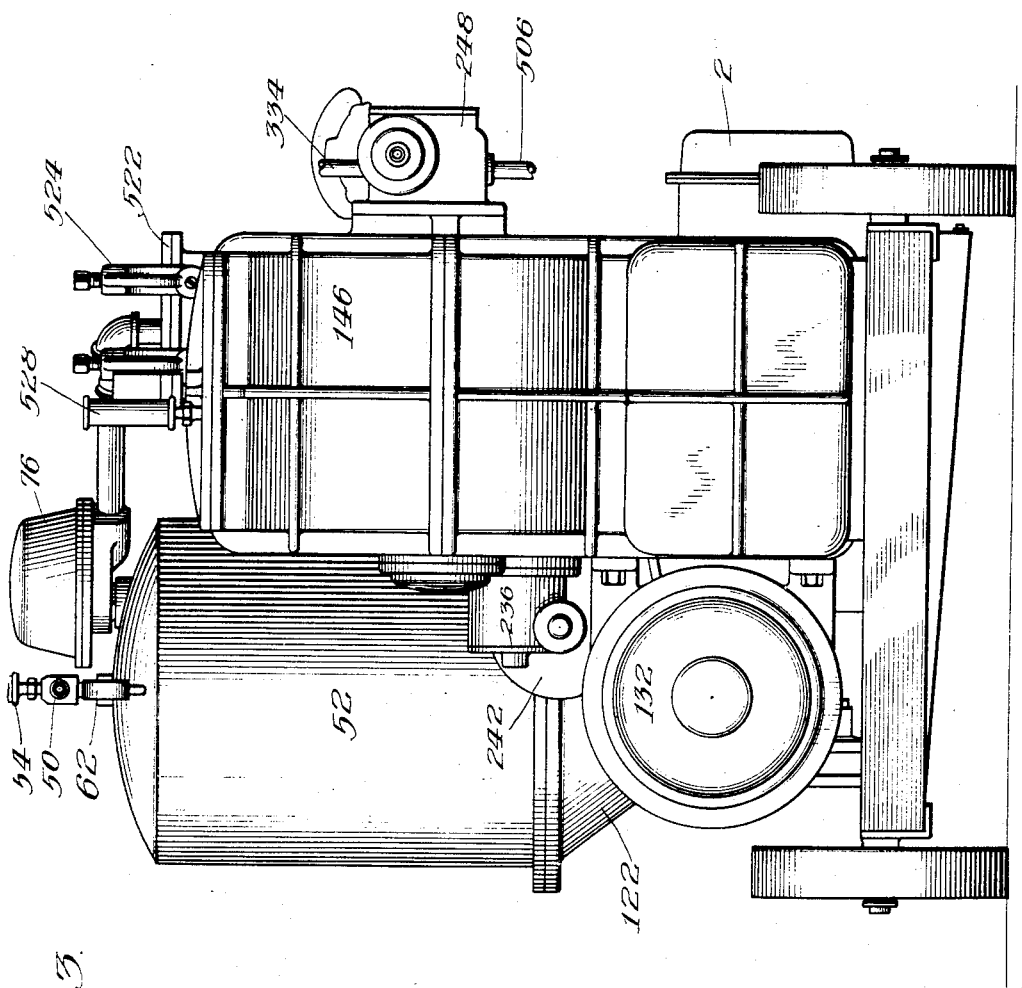

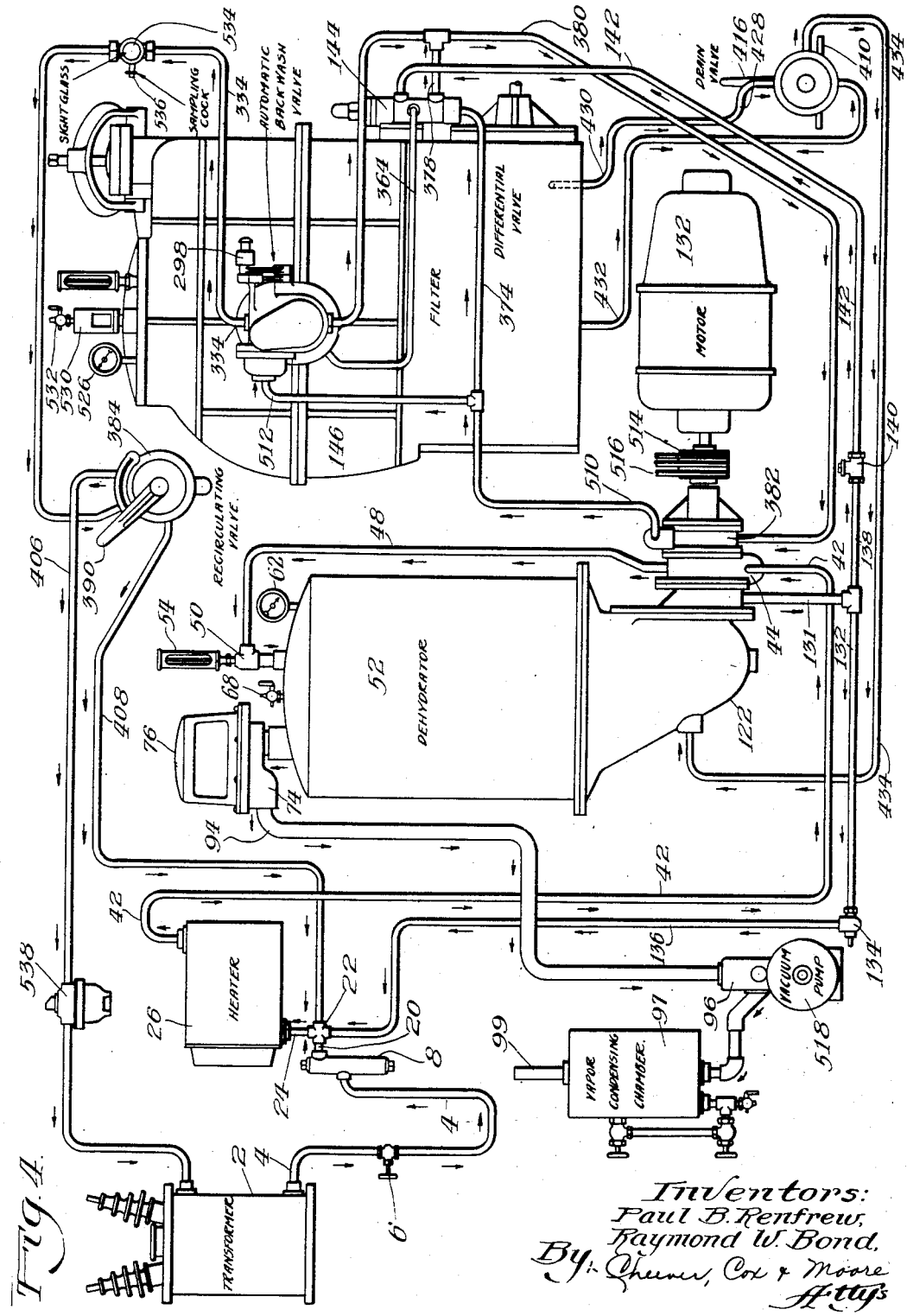

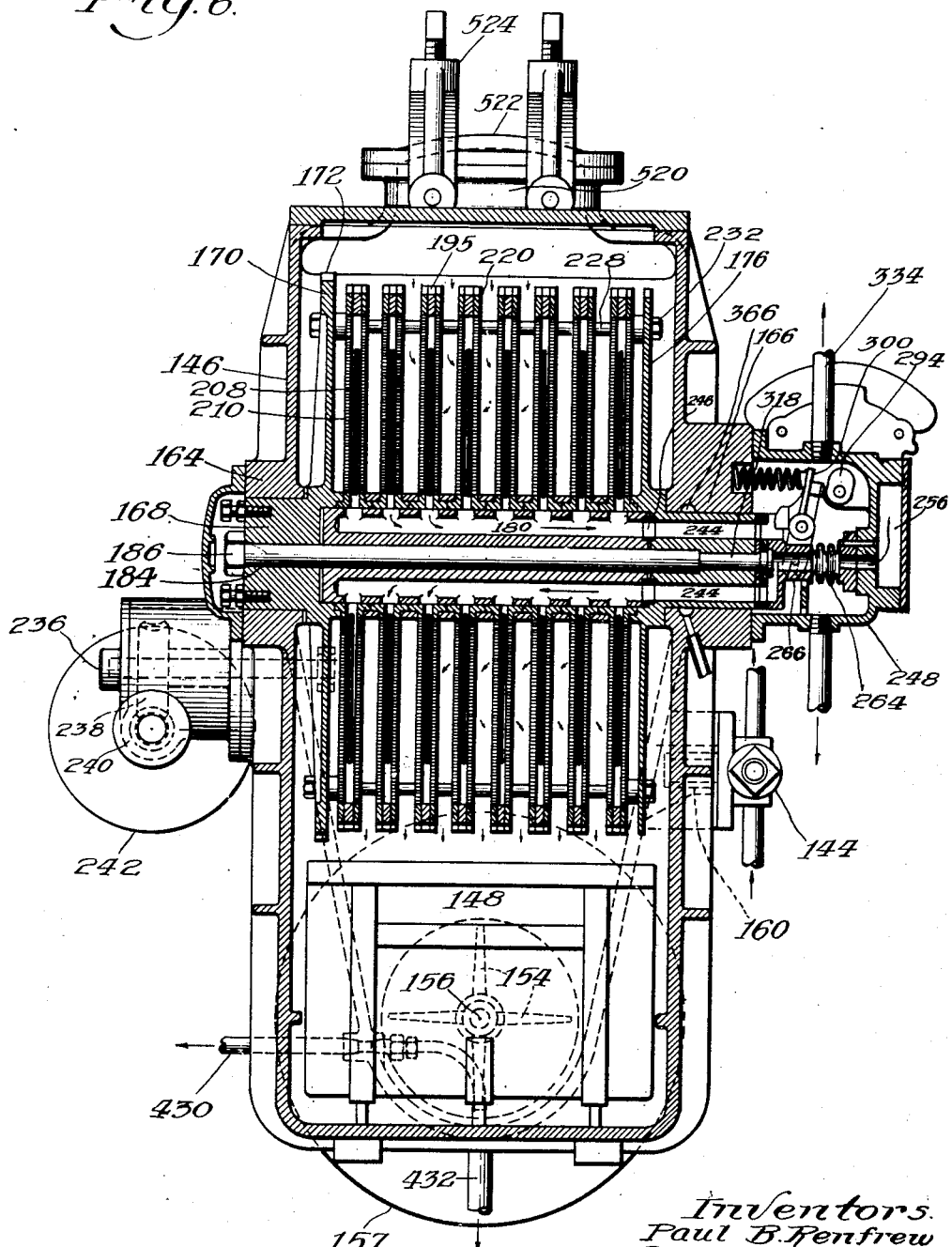

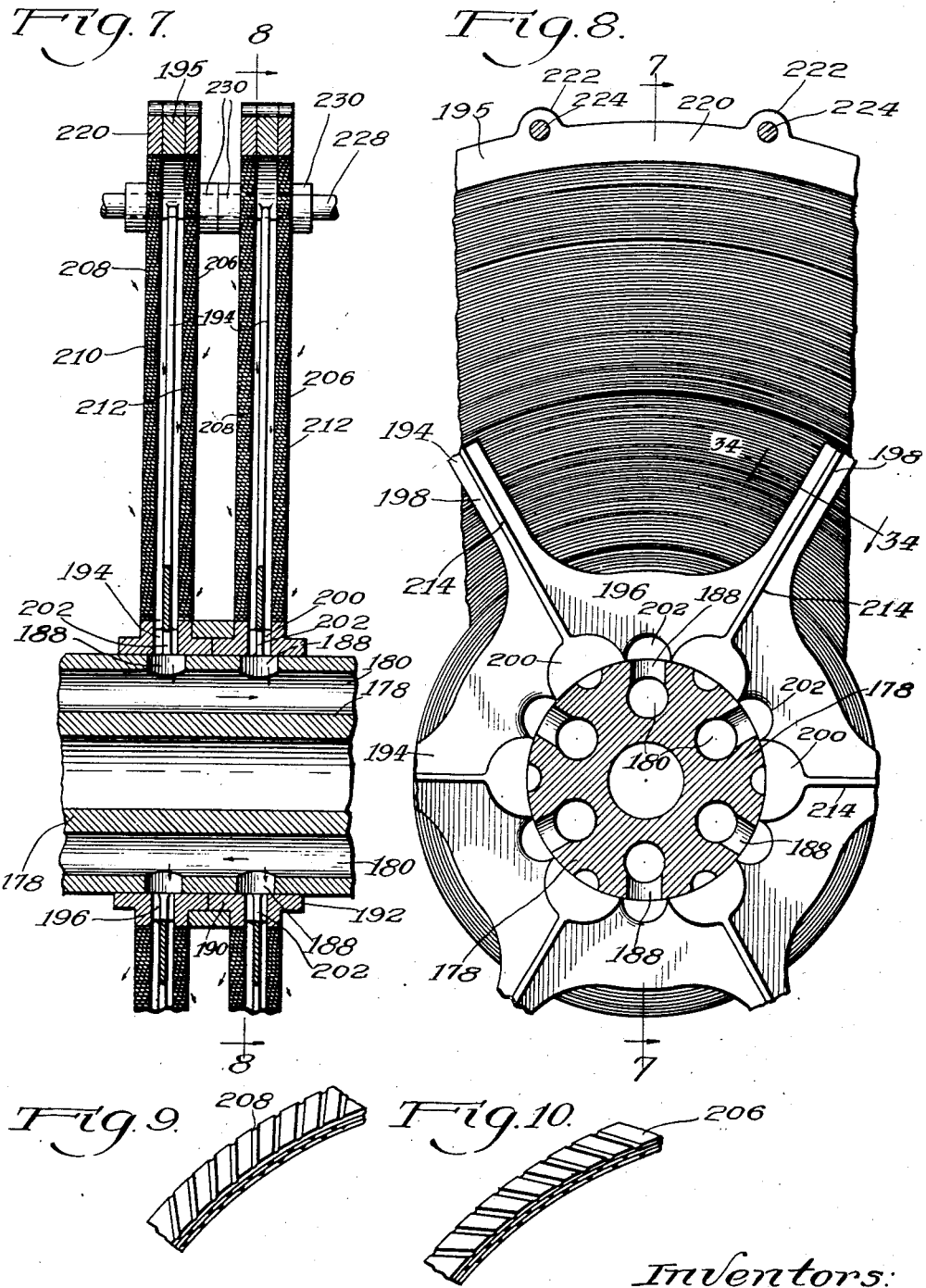

March 9, 1937. P. B. RENFREW ET AL 2,073,026
LIQUID PURIFYING APPARATUS AND PROCESS
Filed March 4, 1932 18 Sheets-Sheet 8

Inventors:
Paul B. Renfrew,
Raymond W. Bond.

March 9, 1937.                    P. B. RENFREW ET AL                    2,073,026
                        LIQUID PURIFYING APPARATUS AND PROCESS
                        Filed March 4, 1932          18 Sheets-Sheet 9
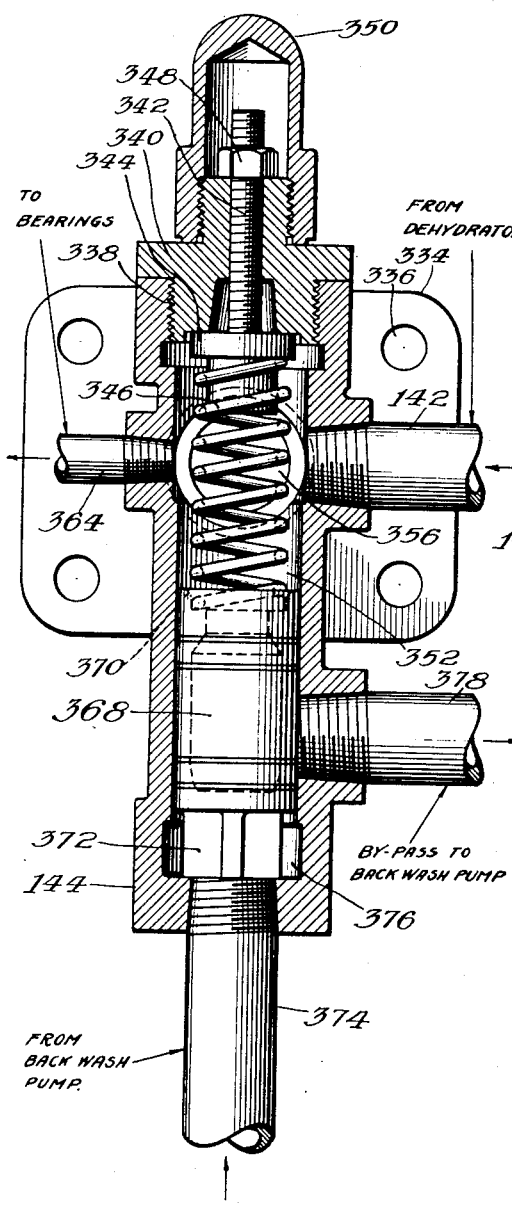
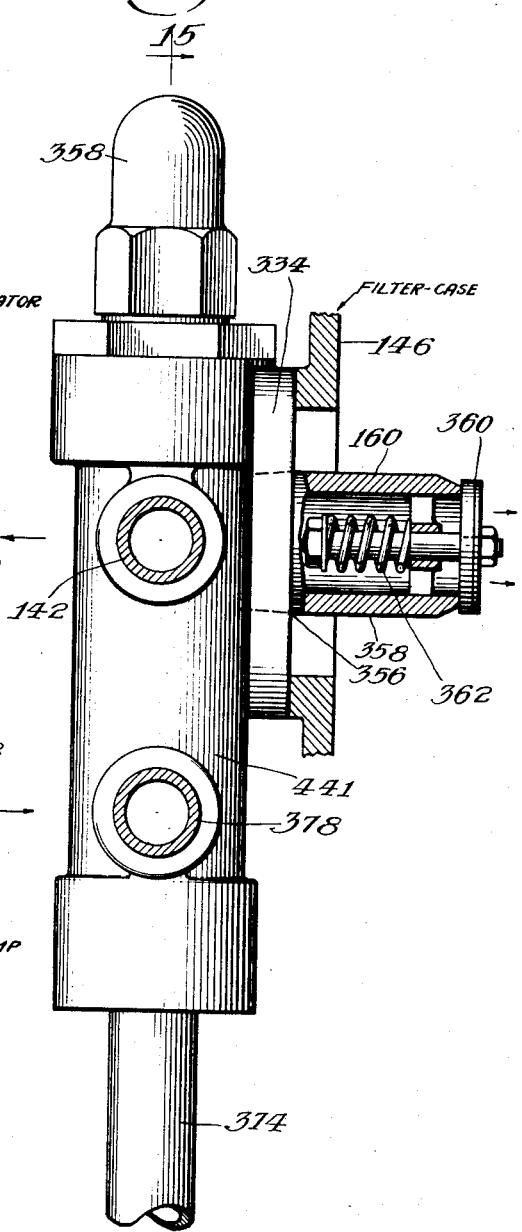
Inventors:
Paul B. Renfrew,
Raymond W. Bond,
By Chiever, Cox + Moore
Atty

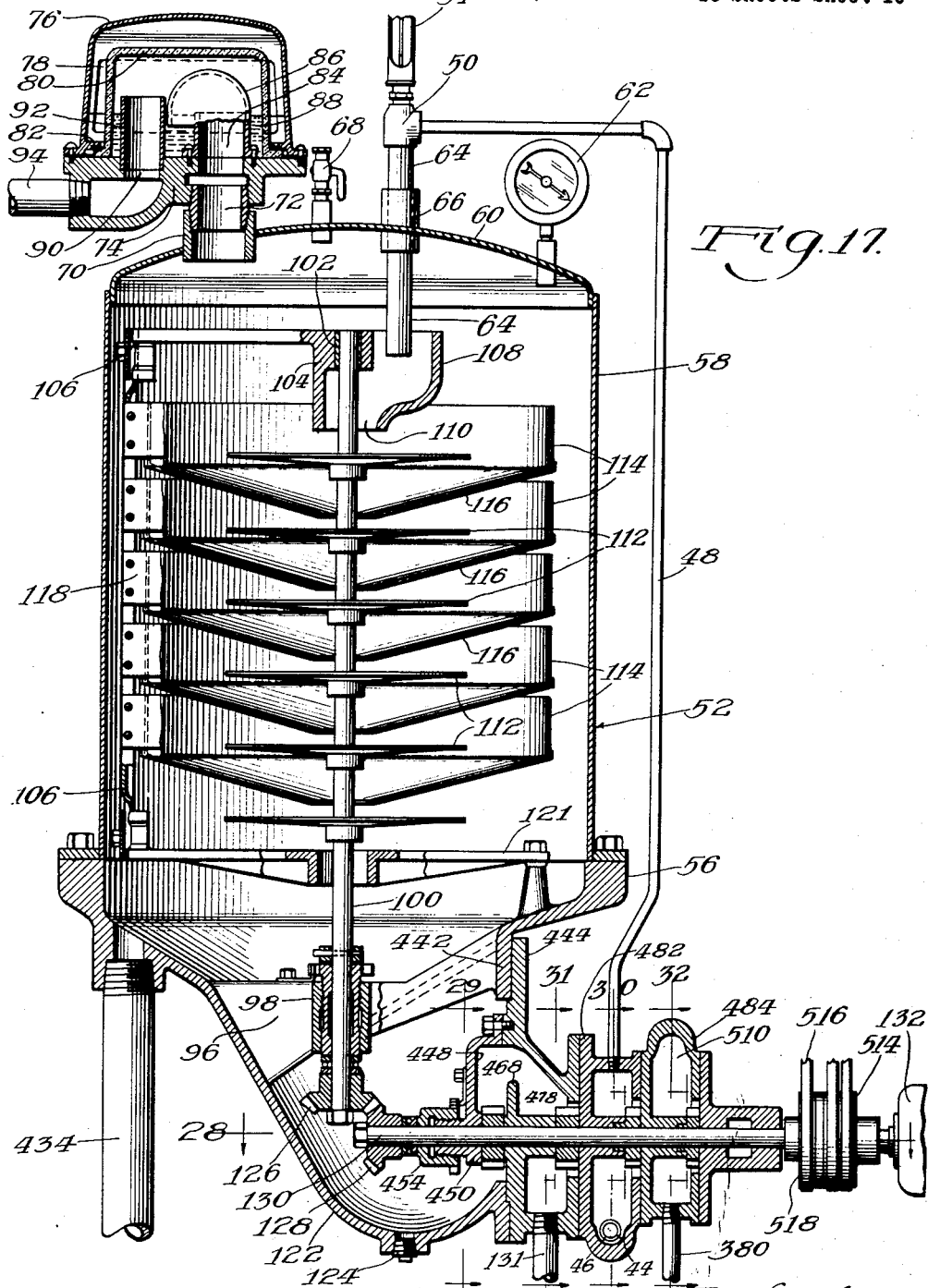

March 9, 1937.　　P. B. RENFREW ET AL　　2,073,026
LIQUID PURIFYING APPARATUS AND PROCESS
Filed March 4, 1932　　18 Sheets-Sheet 11
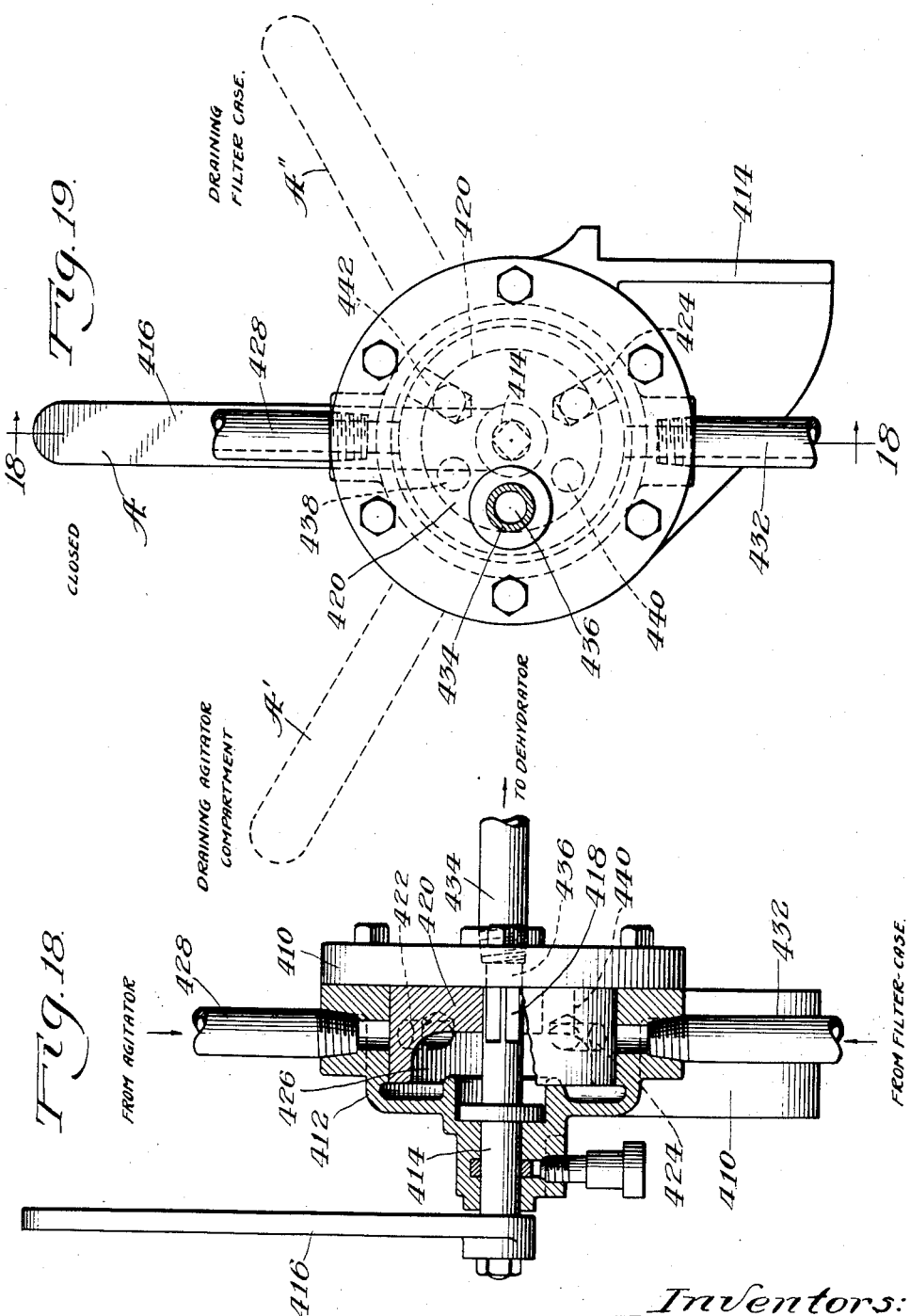

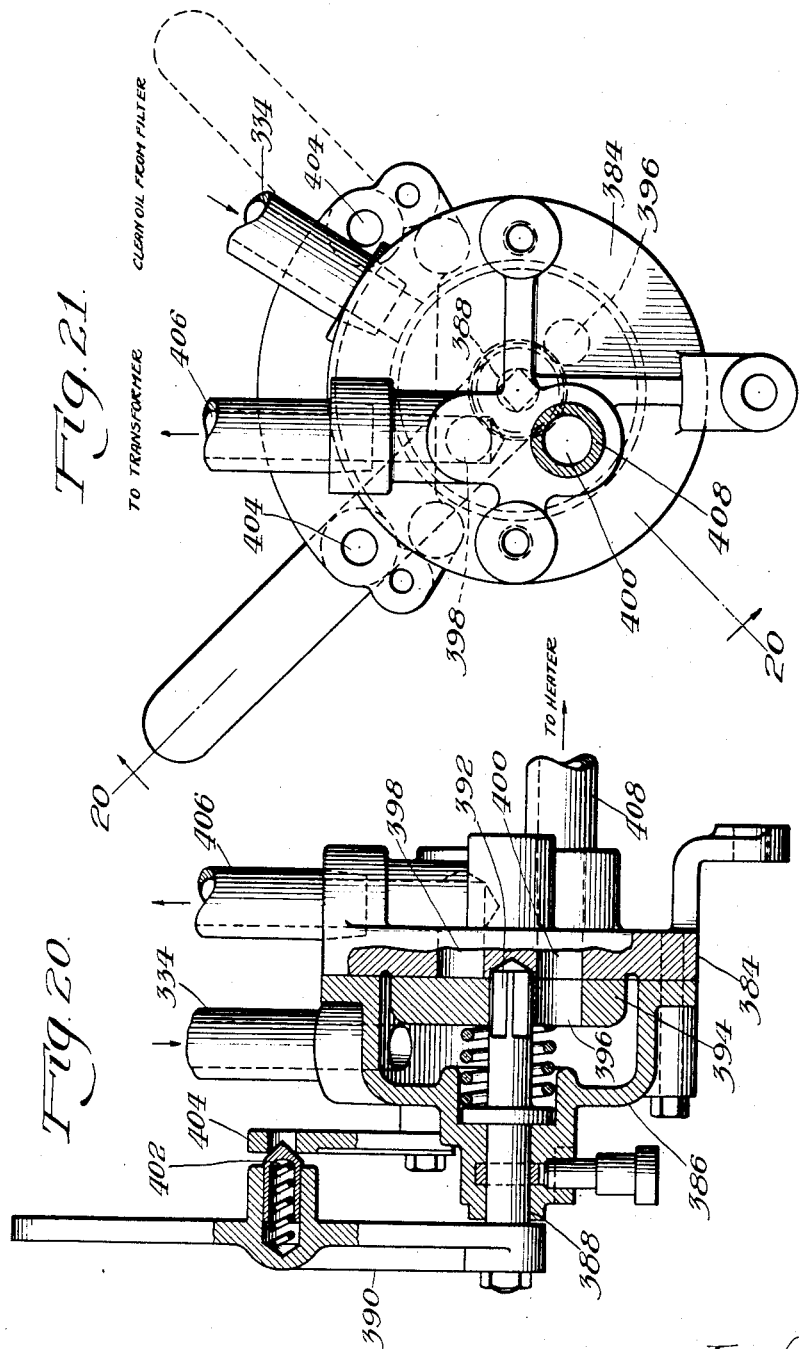

March 9, 1937.  P. B. RENFREW ET AL  2,073,026
LIQUID PURIFYING APPARATUS AND PROCESS
Filed March 4, 1932   18 Sheets-Sheet 13

Inventors:
Paul B. Renfrew,
Raymond W. Bond,
By Cheever, Cox + Moore
Attys

March 9, 1937.  P. B. RENFREW ET AL  2,073,026
LIQUID PURIFYING APPARATUS AND PROCESS
Filed March 4, 1932   18 Sheets-Sheet 14

Inventors:
Paul B. Renfrew,
Raymond W. Bond,
By: Cheever, Cox & Moore
Attys.

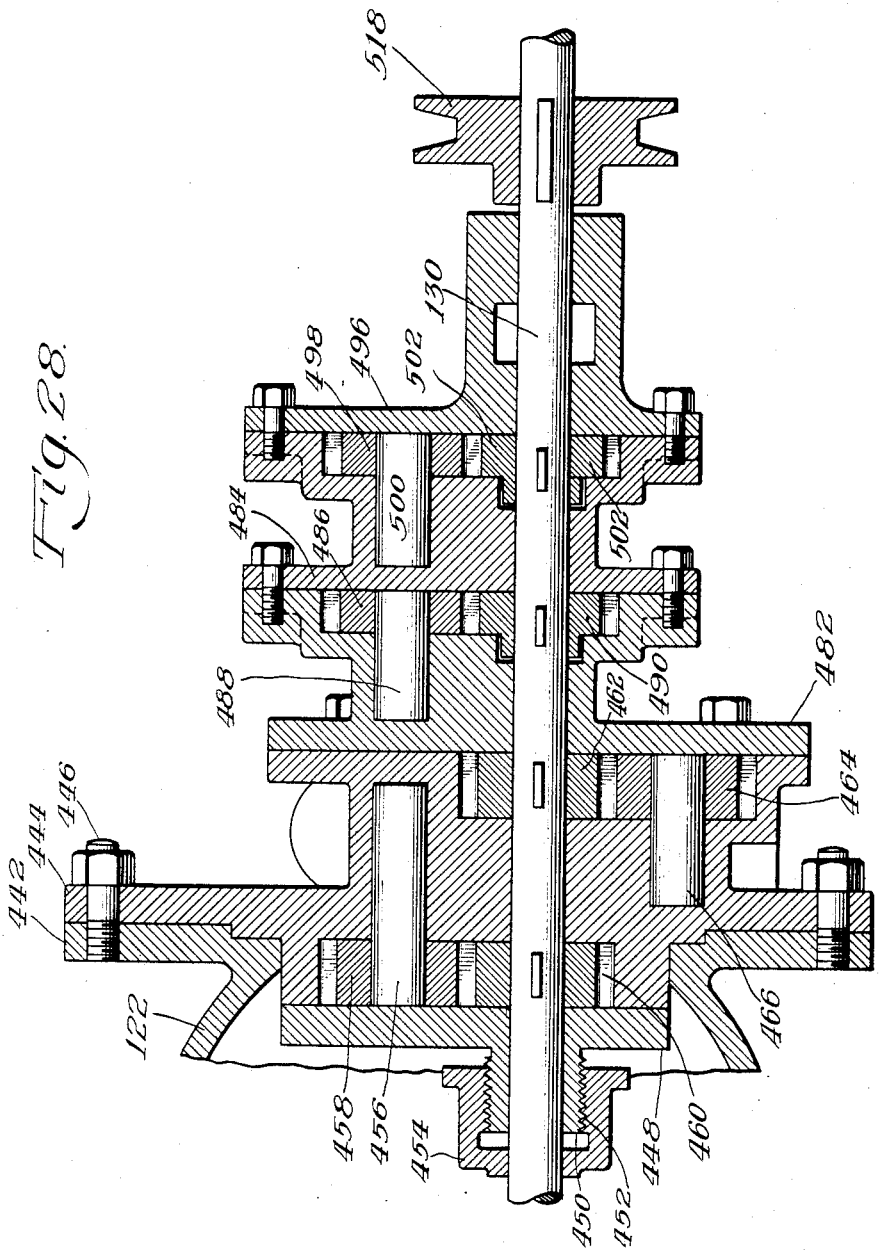

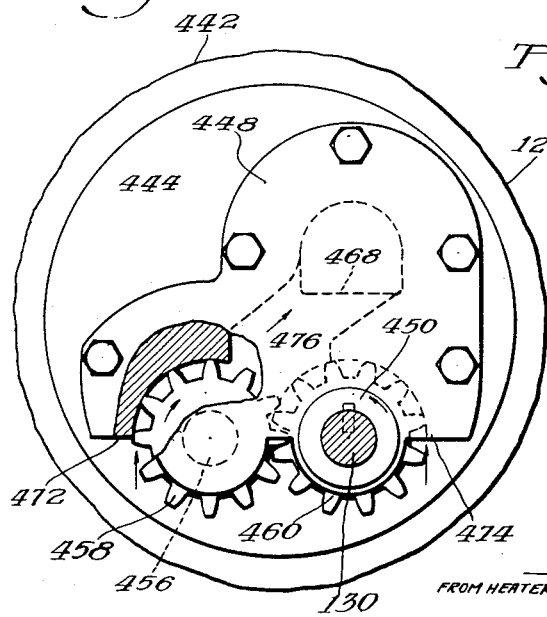

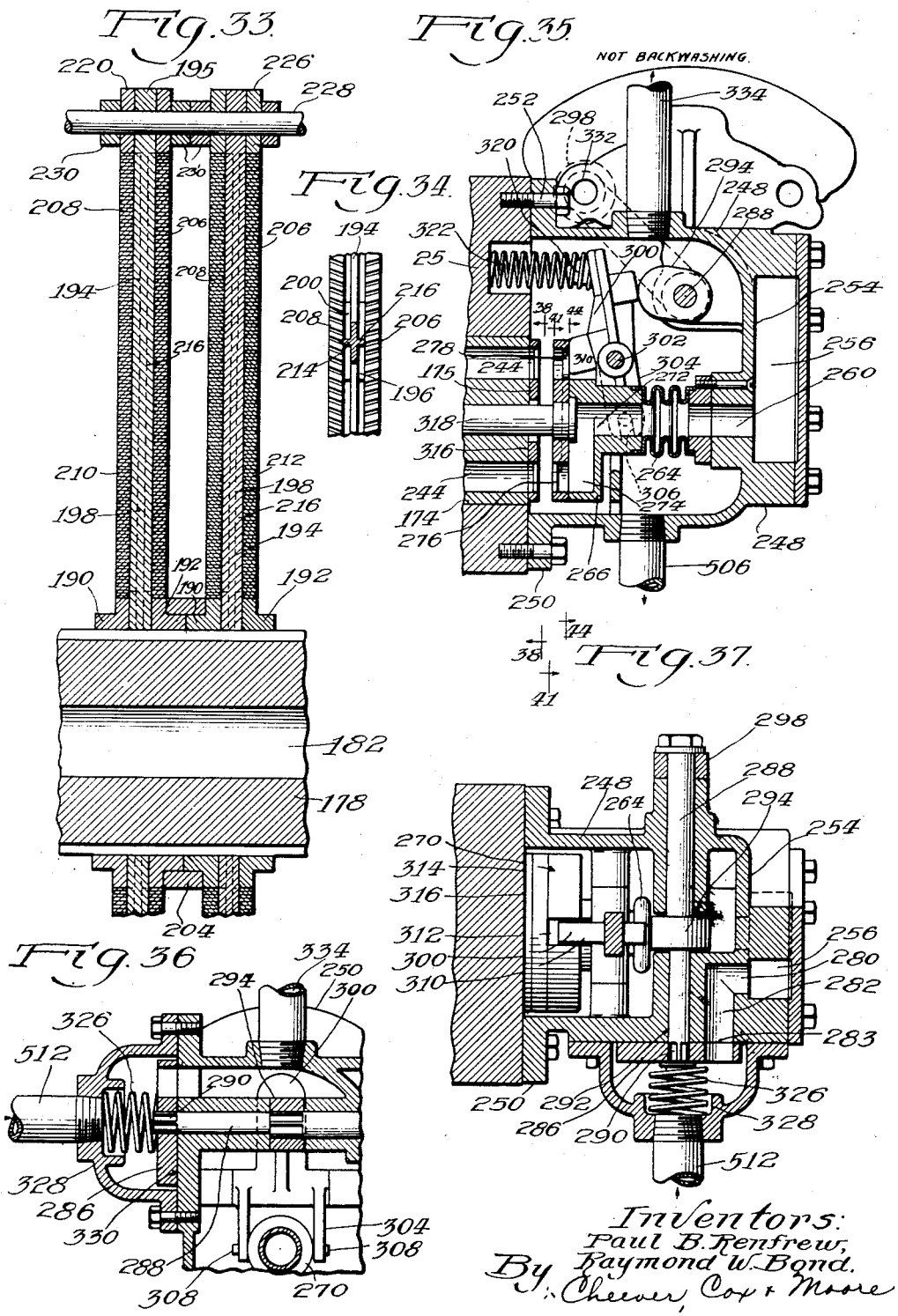

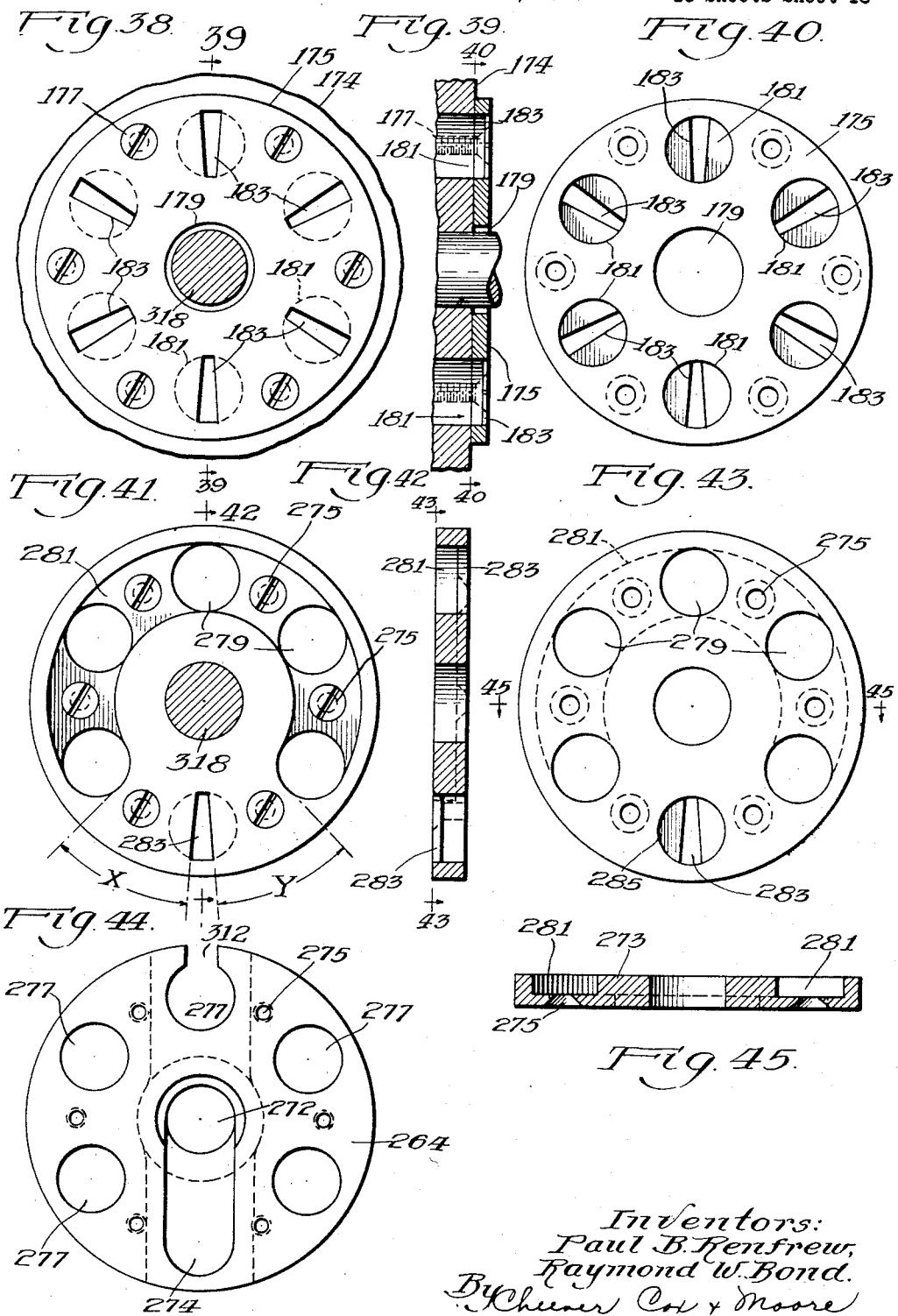

Patented Mar. 9, 1937

2,073,026

UNITED STATES PATENT OFFICE 2,073,026

LIQUID PURIFYING APPARATUS AND PROCESS

Paul B. Renfrew and Raymond W. Bond, Fort Wayne, Ind., assignors to S. F. Bowser & Company, Inc., Fort Wayne, Ind., a corporation of Indiana Application March 4, 1932, Serial No. 596,764

5 Claims. (Cl. 210—200)

This invention relates to the method and apparatus for removing impurities from electrical oils such as transformer oils, circuit breaker oils and oils used in oil-filled cables and the like.

One of the objects of the present invention is to provide a method and apparatus for efficiently, quickly and economically processing or treating the above described oils to remove therefrom free water in any form, for removing dissolved gases such as air and gases resulting from oxidation or arcing action of the oil, for removing dissolved sludge or dissolved products of insulation compounds used in the manufacture of electrical apparatus, for freeing the oil of any suspension irrespective of the size of the particle, and for reducing the organic acid content of the oil without introducing water or chemical solutions into the oil.

Yet another object of the invention is to provide such a process that the foregoing objects will be accomplished in a single pass of the impure, contaminated or dirty oil through the reclaiming apparatus at its rated reclamation capacity, regardless of the condition of the oil.

Yet another object of the invention is to provide an improved process and apparatus for filtering electrical oils of the character described and wherein during the filtering process and simultaneously therewith the filtering device is automatically and continuously backwashed so as to dissolve and remove the cakes of impurities accumulating during the filtration process.

Yet another object of the invention is to provide an improved type of filter mechanism for simultaneously filtering and backwashing oil and wherein the oil is forced through the filter in one direction at a predetermined pressure and is subsequently forced through the same filter in another direction at a higher pressure and in a continuous manner so as not to interrupt the filtering operation.

Yet another object of our invention is to provide an apparatus for filtering and treating electrical oils such as switch oil wherein a pre-coat of porous filter-aid is introduced into the filtering compartment and applied to the filtering surface to insure positive removal of injurious substances, and wherein means is associated with the filter and the system for preventing this filter-aid from reaching any movable parts such as bearings and the like.

Yet another object of our invention resides in a novel type of rotatable filter wherein the same is composed of independent sections and wherein associated means is provided for backwashing certain of said sections while simultaneously filtering other of the sections.

Yet another object of our invention resides in the novel type of differential pressure valve associated with the filtering mechanism and with the pressure lines whereby the automatic backwash of one of a number of filter sections may be accomplished simultaneously with the filtration of the oil through the other sections.

Yet another object of our invention resides in the novel type of pump mechanism, especially adaptable for use with our improved oil treating apparatus.

Yet another object of our invention resides in the provision of a novel type of circulating system for the dirty oil, the dehydrated oil, the clean oil, the backwash oil, the re-circulated oil and the drained oil whereby various oil circuits are provided for accomplishing certain advantageous features in our improved apparatus.

These and other objects of our invention will be apparent from a perusal of the following specification when taken in connection with the accompanying drawings wherein Fig. 1 is a side view in perspective of our improved apparatus as mounted upon a single portable base;

Fig. 2 is a plan view thereof;

Fig. 3 is an end view of Fig. 1;

Fig. 4 is a diagrammatic view of the apparatus including the circulating circuits;

Fig. 5 is a view on line 5—5 of Fig. 2;

Fig. 6 is a sectional view on line 6—6 of Fig. 5;

Fig. 7 is a section on line 7—7 of Fig. 8;

Fig. 8 is a section on line 8—8 of Fig. 7;

Fig. 9 and Fig. 10 are perspective views of the layers of filtering ribbon or tape;

Fig. 15 is a sectional view taken on the line 15—15 of Fig. 16;

Fig. 16 is a side view partly in section of the valve for creating backwash pressure;

Fig. 17 is a sectional view of the dehydrator;

Fig. 18 is a sectional view on line 18—18 of Fig. 19;

Fig. 19 is a perspective view of the agitator compartment and filter drain case valve;

Fig. 20 is a section on line 20—20 of Fig. 21;

Fig. 21 is a view of the recirculating valve.

Figure 11:
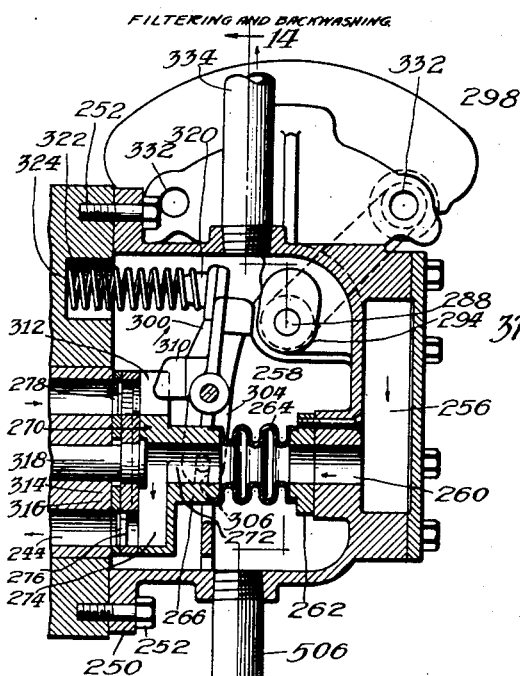
Fig. 11 is a sectional view on line 11—11 of Fig. 13.
Figure 12:
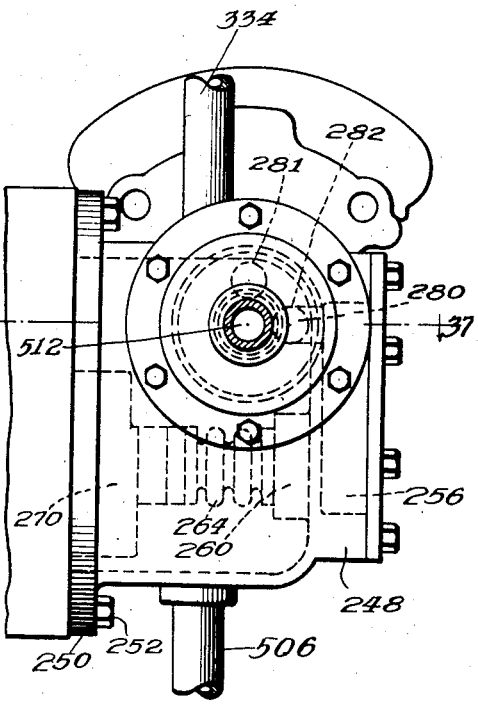
Fig. 12 is a view similar to Fig. 11, but not in section.
Figure 14:
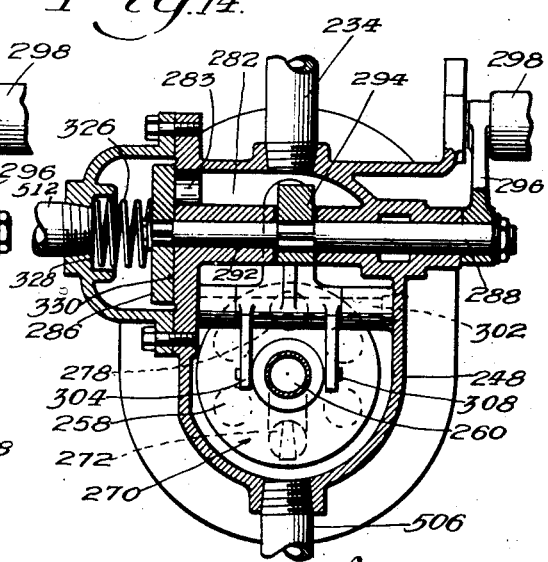
Fig. 14 is a view thereof taken on line 14—14 of Fig. 11.
Figure 22:
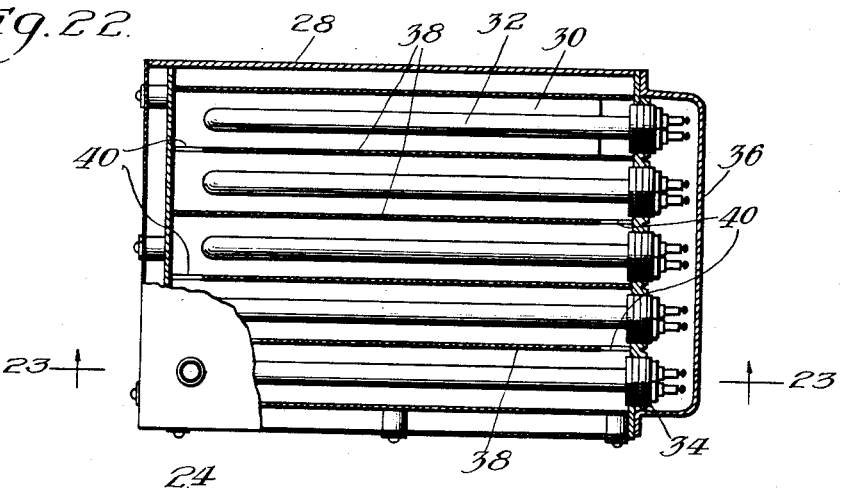
Figure 23:
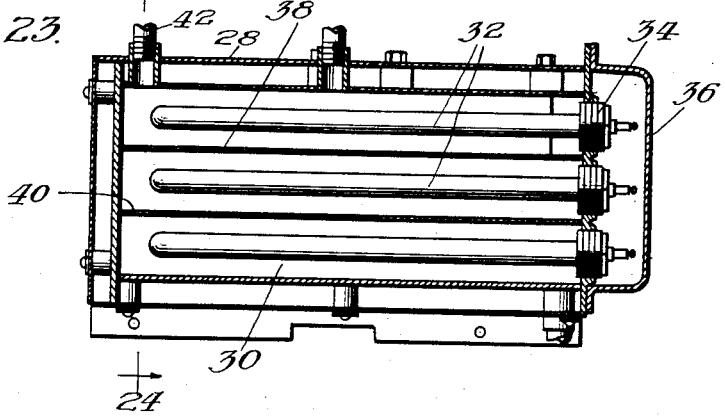
Figure 24:
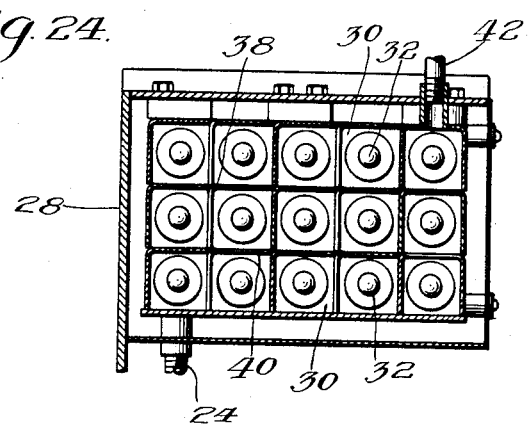
Figure 25:
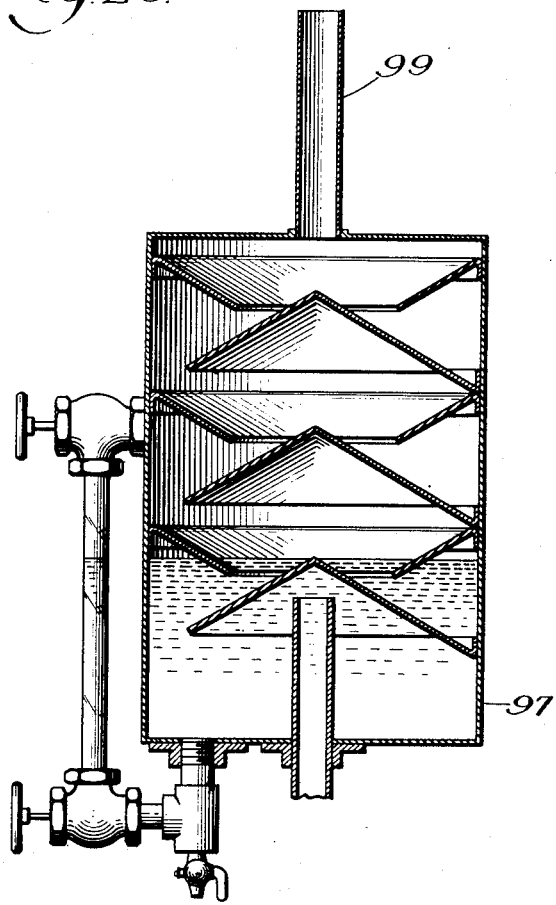
Figure 26:
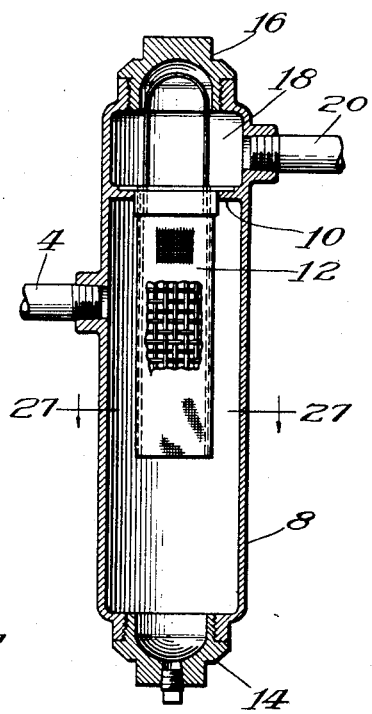
Figure 27:
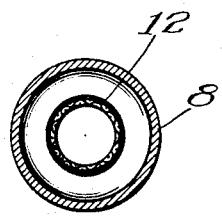

Figs. 22, 23 and 24 are detailed views of the heater unit,—Fig. 23 being taken on line 23—23 of Fig. 22, and Fig. 24 being taken on line 24—24 of Fig. 23;

Fig. 25 is a sectional view of the vapor condensing chamber;

Fig. 26 is a sectional view of the line strainer;

Fig. 27 is a section on line 27—27 thereof;

Fig. 28 is a sectional view of the circulating pump;

Fig. 29 is a section taken on line 29—29 of Fig. 17;

Fig. 30 is a section taken on line 30—30 of Fig. 17;

Fig. 31 is a section taken on line 31—31 of Fig. 17;

Fig. 32 is a section taken on line 32—32 of Fig. 17;

Fig. 33 is a section taken on line 33—33 of Fig. 5;

Fig. 34 is a section on line 34—34 of Fig. 8;

Fig. 35 is a view corresponding to Fig. 11, but showing the backwash valve open whereby to stop the backwashing operation;

Fig. 36 is a fragmentary view of Fig. 14 showing the valve in turned position to permit the discharge of clean oil into the backwash valve casing chamber 258;

Fig. 37 is a section taken on line 37—37 of Fig. 12;

Fig. 38 is a view looking back at the shaft 174, looking in the direction of the arrows on section line 38—38 of Fig. 35;

Fig. 39 is an enlarged section showing the valve seat 316 mounted on the end face of the hub 174 of Fig. 35;

Fig. 40 is a perspective view taken along the line 40—40 of Fig. 39 and showing the rear face of the valve seat disc 316;

Fig. 41 is a view on line 41—41 of Fig. 35 and shows the face of the backwash valve disc;

Fig. 42 is a sectional view taken through line 42—42 of Fig. 41;

Fig. 43 is a view on line 43—43 of Fig. 42;

Fig. 44 is taken on line 44—44 of Fig. 35 and looking in the direction of the arrows thereof, directly at the backwash valve body 270; and Fig. 45 is a section on the line 45—45 of Fig. 43.

By referring to Fig. 4 of the drawings it can be seen at a glance that dirty oil coming from the bottom portion of the transformer is first passed through a line strainer and thence passes to the electrical heaters where the oil is raised to the proper temperature. From the heaters the oil is pumped to the top portion of the dehydrator where the moisture and undesirable entrained gases are removed. From the dehydrator the oil is pumped under pressure into the filter mechanism where all impurities are removed. The clean, filtered oil is thence passed through a sight glass, a recirculating valve, a measuring meter and thence finally into the top of the transformer. In order most easily to describe the preferred type of apparatus for carrying out our process, we shall endeavor to describe the various parts thereof in accordance with the manner in which the oil circulates therethrough, using Fig. 4 as a basical view showing the general arrangement of the parts and the circulatory system interconnecting the same with the transformer. In Fig. 4 the oil flows from the transformer 2 by means of pipe 4 past a hand-operated valve 6 to the line strainer 8. This line strainer is shown in detail in Figs. 26 and 27 of the drawings as comprising an elongated cylinder 8 having an internal partition 10 therein forming a seat for a replaceable oil strainer 12. The bottoms and tops of the cylinder 8 are closed by threaded caps 14 and 16 respectively. The oil flows into the cylinder through the pipe 4, thence through the strainer 12 which may be of any desired construction, preferably wire mesh, for removing the larger impurities in the oil, and thence the oil flows through the hollow portion of the strainer into the compartment 18 where it passes outwardly through the pipe 20 to a junction fitting 22. This junction fitting 22 is provided with openings for the connection of four different pipes as hereinafter described. One of these pipes 24 leads to the electric heater 26 for the purpose of heating the oil to the proper dehydration temperature approximately 100 to 175° F. The circulation of oil in these heating units is such that all the 20 heaters are completely submerged, thus subjecting the oil to the maximum amount of heat generated by each of the elements. The heater comprises sufficient heating elements to raise the oil temperature through a wide range of temperatures. The heating elements are operated in conjunction with the motor starting switch and are individually controlled so that the required temperatures may be obtained with a minimum number of elements. In this way, danger of injuring the oil by overheating is entirely eliminated, and electrical current consumption is minimized.

While the heaters may be of any desired type of construction, we prefer the construction shown in the drawings wherein the heater is preferably formed of an outer casing 28 and containing a plurality of individual heating compartments 30 within which compartments are located a plurality of unit electric heaters 32 which are adapted to threadedly engage as at 34 in an inner end wall of the compartment, whereby the heaters may be individually replaced or repaired. An end cap 36 encloses that end of the heater to which the electrical wires are connected. In order to permit varying degrees of heating, the oil or other liquid is arranged to pass through the separate heating chambers in series and to this end the partitions 38 between and forming the separate heating chambers, are provided with staggeringly arranged openings 40 so that the inflowing oil is forced to traverse the length of each heating compartment on its way through the heater. In this manner, by going in and out the individual heaters so that one or two or any number of heaters up to the maximum are put into operation, the heating effect may be controlled.

The oil, upon leaving the heater through the pipe 42 as shown particularly in Fig. 4 of the drawings, passes to the multi-stage pump mechanism and particularly to the central or intermediate section 44 thereof by means of the inlet 46 which connects with pipe 42. This is shown more clearly in Fig. 17 of the drawings. The details of construction of the pump mechanism are shown in Figs. 28 to 32 inclusive and will be described hereinafter.

For the present it is sufficient to say that this pump controls the feed of oil from the transformer and from the heater and controls its rate of flow outwardly through pipe 48 to a fitting 50 on top of the dehydrator 52. The fitting 50 is provided with a thermometer 54 to indicate the temperature of the oil passing to the dehydrator.

The dehydrator

The dehydrator shown in detail in Fig. 17 comprises a supporting base 56 on which is mounted an enclosing shell 58 forming an air-tight container. This shell at the top is provided with a cover 60 carrying a vacuum gauge 62 having communication with the interior of the dehydrator. In addition, the fitting 50 discharges into a pipe 64 passing through a sleeve 66 mounted on the top 60 of the dehydrator whereby oil is discharged through pipe 64 into the upper interior portion of the dehydrator. The cover 60 is likewise provided with the relief cock 68 and with a sleeve 70 having a threaded portion to receive a coupling member 72 to which is attached a combined vacuum chamber and liquid seal device. This liquid seal device comprises an outer casing or dome 76 suitably attached to the base 74 and provided with a side opening 78. In addition there is provided an inner dome 80 of glass or other transparent material which is clamped to the base 74 by means of a flange 82 on the inner wall of the outer dome 76, a suitable gasket or sealing ring affecting an air-tight joint. Base 74 is provided with an opening 84 to which an inverted J-shaped pipe 86 is connected and the inverted short leg of this pipe is open and faces downwardly so as to discharge beneath a body of liquid 88, the upper level of which lies within the glass dome and above one end of the short leg of the J-shaped pipe, whereby to effect a seal and whereby any air discharging through the J-shaped pipe must necessarily discharge under the surface of the liquid. In addition, the base 74 is provided with another opening 90 to receive an upstanding short length of pipe 92 the upper end of which terminates above the level of the liquid 88 in the inner dome. This pipe 90 connects with a pipe 94 connecting with a vacuum pump 96 driven by suitable means. This vacuum pump maintains a vacuum of from 28″ to 29½″ of mercury within the dehydrator casing 58, when the barometer is at 760 mm. of mercury.

Within this vacuum casing which is maintained under a very high degree of vacuum, as hereinbefore described, means is provided for thoroughly atomizing the oil coming in through the nozzle or pipe 64. In the present invention we accomplish this atomization by means of revolving discs. To this end the base or support 56 of the dehydrator is supported with an internally arranged bracket 96 providing a bearing 98 at its lower end for a rotatable shaft 100 mounted centrally of the dehydrator casing 58. This shaft, in turn, is mounted in a bearing 102 formed in a bracket 104 mounted at the top of the dehydrator casing 58. In the present instance, this bracket 104 is affixed to an inner upstanding support in the casing as shown at 106. In addition, this bracket 104 forms a receiving nozzle 108 having a discharge or spout 110 for discharging the incoming oil at the central portion of the shaft 100. This shaft carries rigidly, thereon, a number of rotating discs 112 arranged in vertical series and in spaced apart relation. Six of these revolving discs are shown. It will be noted that the discharge spout 110 discharges directly at the center of the uppermost or top revolving disc 112. A series of stationary baffles 114 are arranged within the casing 58. Each of such baffles comprises an impact wall disposed directly opposite the path of trajectory movement of the oil globules as they are thrown from the rapidly revolving discs. In addition, these baffles include a downwardly inclined section 116 arranged to receive the oil which is impacted against the substantially vertical walls 114 and to convey the same downwardly and inwardly toward the center of the next lower disc where the oil is then discharged upon said next lower disc and at the center thereof. These baffles are arranged in superimposed vertical relation so that the incoming oil which is passed into the central portion of the uppermost revolving disc is thence thrown outwardly against the first impact wall from which point the oil flows downwardly along the inclined section 116 under the central portion of the next lower revolving disc, thence outwardly and downwardly again in a succession of similar paths. These baffle plates 114 and 116 are supported in place about the central rotating shaft 110 by means of a series of connections 118 carried by the upstanding bracket arm 106 either on the basal support itself, or on a bracket 121 affixed to the bottom of the support 56. If desired, these baffles may be secured directly to the inner portion of the casing 58. The bottom portion 56 of the dehydrator is formed with a bowl 122 closed to the outside air provided with a drain 124. The bottom of drive shaft 100 extends down into this bowl and is provided with a bevel gear 126 meshing with a similar gear 128 on the pump shaft 130. This pump shaft is driven by an electric motor 132. The motor thus rotates shaft 130 which in turn rotates the vertical shaft 100 and drives the revolving discs at about 1200 R. P. M. The speed may vary from approximately 760 to 3000 R. P. M. The multi-stage pump hereinafter described is preferably bolted directly to the bowl portion 122 and is arranged so that the dehydrated oil coming from the revolving discs and the stationary baffles falls to the bottom of the bowl and is pumped out of said bowl through the pipe 130 by means of the pumping mechanism.

From the foregoing it will be seen that the dirty oil heated to a temperature of approximately from 100 to 175° F., is introduced into the dehydrating chamber under a very high vacuum, approximately 28 to 29½ inches of mercury, where it is poured into the central portion of the rapidly rotating discs which causes immediately a dispersion of oil in such a manner that any water previously dissolved in the oil is immediately flashed from the oil because of the evaporation of the water at the reduced boiling point and because a spaced relationship is set up on the highly revolving discs between any two particles of oil. In other words, the globules of oil are thrown with considerable violence outwardly and during their travel spirally outwardly across the faces of the discs, are subjected to the high vacuum so that any moisture or entrained volatile gases will be brought to the surface of the globule oil films and will be flashed into vapor. These globules, upon being thrown from the rotating discs will impact with considerable violence against stationary baffles, which will cause the globules to smash and thereby release any further entrained moisture or undesirable gases. By arranging the rotating discs and intermediate baffles in succession in the manner illustrated, this treatment of the highly atomized and finely divided oil is prolonged so that by the time the oil reaches the end of its travel in the vacuum chamber, all of the moisture and undesirable gases will have been removed from the oil. This moisture, vapors or volatilized gases will be immediately removed by the vacuum pump, the vapors and gases flowing out through the pipe 70 upwardly through the J-shaped connection 84, to the vacuum line 94 leading to vacuum pump 96 in turn discharging into the vapor condensing chamber 97 from which the volatile impurities are discharged through pipe 99, see Fig. 25.

In the dehydrator, the area of the oil exposed to the vacuum condition is enormously increased by the centrifugal dispersion and impact with the result that the dissolved water and gases are incidentally and completely liberated from the "mist-like" oil and are evacuated immediately to the atmosphere through the volatile impurities discharge outlet from the pump.

After dehydration, the oil collects in the sump or bowl 122 of the dehydrator from which point it is conveyed to the filtering mechanism now to be described, which latter insures positive removal of all suspended and sedimentary matter in a single passage through the apparatus at its rated capacity, regardless of the impurity of the oil and without introducing into the oil any deleterious suspensions from the filtering element.

*The filtering mechanism*

By referring to Fig. 4 it will be seen that the oil pumped from the dehydrator through pipe 131 may take one of two paths. It may either flow through pipe 132 past relief valve 134 to pipe 136 connecting with the pipe 24 leading to the heater, or it may flow from pipe 131 to pipe 138 past check valve 140 to pipe 142 to the differential valve 144. The first mentioned circuit is arranged in order to avoid damage to the system on account of excessive pressure due to the possible clogging of the filter elements. In this instance, the by-pass valve 134 is set, for instance, at 35 pounds. This valve will then automatically open when the pressure exceeds 35 pounds and the by-passed oil from the dehydrator will be forced through the heater thence through the dehydrator and back to the starting point, and will continue to circulate through these elements until the pressure is relieved.

Discussing now the passage of the oil from the dehydrator sump, through pipe 131 and past check valve, 140, the purpose of this check valve is to prevent any liquid forced there-past from flowing back into the dehydrator chamber when the pumps are stopped, by the action of the vacuum in the dehydrator and the pressure in the filter case.

By referring to Figs. 5 to 10 inclusive it will be seen that the filtering mechanism proper comprises a casing 146 having an upper part and a lower part. The upper part supports and houses the slowly revolving filter units while the lower part provides a sump holding a sludge pan 148 in which is deposited the residue removed from the filter disc during the backwashing operation. The casing 146 is divided by a partition or dam 150 whereby to provide an agitator compartment 152 in which is located an agitator 154 mounted on shaft 156. This shaft has its bearings in the partition or dam 150 and in the side wall of the casing 146. This shaft is driven by a pulley 157. The oil enters the agitator compartment through a pipe or nozzle 160 coming from the differential pressure valve. This nozzle or pipe 160 is shown in detail in Fig. 16 of the drawings. For the present moment it is sufficient to state that the oil is forced through this pipe 160 into the agitator compartment to fill the latter, and then the oil flows upwardly over the dam 150. From this point the oil then flows into the filter chamber proper in which the filtering means is located.

As shown clearly in Fig. 6 of the drawings, filter casing 146 is provided with portions forming opposed bearings 164 and 166 in which are rotatably mounted a hub 168 having a radially extending disc 170 at one end thereof provided with peripheral teeth 172 and in which opposed bearing 166 is rotatably mounted another hub 174 likewise carrying a perpherally extending disc 176. These discs 170 and 176 are arranged to have clamped between them a series of filter sections now to be described. Mounted between hubs 168 and 174 there is a hollow shaft 178 which is provided with a plurality of longitudinal oil passages 180. Six of these oil passages are shown. In addition, the central portion of the hollow shaft is provided with the longitudinally extending bore 182 to receive a centering pin 184 provided with a head 186 which prevents the pin from sliding to the right. In addition this hollow shaft 178 is provided with a plurality of radially extending passages or ports 188 which register with the longitudinal passages 180. These radially extending ports 188 are for the purpose of forming communication between the longitudinally extending passages in the hollow shaft and the filtering elements hereinafter to be described. There are groups of six of these ports arranged about the periphery of this hollow shaft along its length, there being sufficient groups to correspond to the number of filtering drums or units in use. A plurality of filtering units are mounted longitudinally of the hollow shaft and are adapted to rotate therewith. Each of these units comprises a pair of spaced rings 190 and 192 between which are located a spider 194. This spider 194 is comprised of a circular ring 195 and a hub section 196 and interconnecting arms or webs 198. On the bottom portion of the hub 196 are metallic liquid sealing pads 200 which at their inner portions are formed arcuately to conform with the periphery of the hollow shaft. There are six of these webs or arms 198 and correspondingly six of these arcuate oil sealing members contacting the periphery of the hollow shaft. The radially extending ports 188 formed in the hollow shaft hereinbefore described are located intermediate each of these arcuate sealing devices and that portion of the spider which is directly opposite the radial port 188 is notched out as at 202 to increase or provide a communication between both sides of the web and the radially extending port 188 so that oil may flow from either side of the web directly into the hub through the port 188, the notched portion 202 permitting unrestricted flow therethrough at this point. The construction and arrangement of each one of the filter units is identical. Fig. 7 of the drawings shows 2 of these filter units arranged side by side and maintained in clamped, spaced relation by means of a suitable spacing block 204 which serves also as a clamp.

The filter elements themselves comprise one or more preferably continuous lengths of metallic tape 206 of a very thin cross section and provided with spaced-apart cross channels 208 of very small dimension. This tape is wound spirally upon itself to provide a built-up disc of the general form shown in Figs. 5 and 8. In this manner the metallic filter element comprises a multitude of microscopic or capillary passages extending transversely of the filter element from one face to the other. The construction of this filter element or tape, per se, forms no part of the present invention except for the manner in which it is used in the combination with the other elements of our invention. The construction of the tape itself forms the subject matter of a number of co-pending applications owned by the assignee of the present invention.

From the foregoing it will be seen that each filter unit comprises two of these metallic filtering discs 210 and 212 respectively and that they are separated or maintained in spaced apart relation by means of the intermediate spider 194. Each spider is substantially cruciformed in cross section. i. e., it provides substantially four flanges disposed at right angles to each other. Two of these oppositely extending flanges such as 214 and 216 are arranged to be tightly pressed against the adjacent faces of the filter disc units. This tight contact is maintained from the hub portion of the spider arm clear to the outermost peripheral point so as to divide the entire 360° of the filter disc into a plurality of isolated sections. Since there are six of these spider arms, there are six corresponding filter sections so formed. Each filter section in Fig. 5 is shown at 218. By reason of this construction it will be understood that dirty oil may pass from the outside face of each filter section inwardly to the space in which the spider is located between the two sections and will then flow downwardly through the passage 188 into the central rotating shaft 178. Since the flanges 214 and 216 of each spider arm are pressed tightly into the adjacent faces of the filter discs, they will prevent the oil which enters through the opposite faces of any particular section from passing into any other section that is located between any other two adjacent ribs. In other words, the complete circular face of each disc is divided up into six isolated filtering units each having its own connecting channel to the central rotating hub. This construction is for the purpose of permitting certain of the sections to be filtering while another one of the sections may be backwashing. This backwashing will be subsequently described in detail. The spirally wound tapes are held in clamped position between the clamping block 190 and a clamping ring 220. In the process of forming each filter unit, one end of the spirally wound tape or tapes is fastened, soldered or otherwise attached to one of the rings such as 190 and then the tape or tapes are wound under a tension very tightly and then the clamping ring 220 is forced or slipped over the completely wound disc so as to form an assembly unit. When two of such units are formed, they are placed in position on either side of the spider or web 194 having its outer peripheral at 195. The rings 220 and the spider ring 195 are provided with a plurality of spaced apart outward extending ears 222 and through which pass a plurality of transverse rivets or bolts 224. In addition, at selected intervals the rings 220 and the web rim 195 are provided with short, substantially larger ears 226 likewise adapted to receive therethrough clamping rods 228. A series of spacing ribs 230 are arranged between the sections to correspond with the clamping and spacing rings 204 whereby to hold the sections in desired spaced-apart relation. The clamping rods 228 are drawn tightly by nuts 232 so that the entire filter assembly is tightly clamped in position between the end plates 170 and 176, it being understood that the rods 228 pass also through these end-plates.

The peripheral teeth 172 of the end plate 170 engage the teeth of a drive pinion 234 on a shaft 236 driven by means of the worm gear 238 which in turn is driven by a worm 240 on a pulley 242. A suitable driving speed is selected for rotating the filtering elements quite slowly, for instance, in the present embodiment of the invention the filtering elements will complete a rotation once every two minutes. Obviously, any desired speed of rotation may be availed of.

Referring now to the hub 174 shown at the right end of the shaft in Fig. 6 of the drawings, it will be seen that this hub includes the hollow sleeve 174 and the integral radial disc 176 which is clamped to the filtering units and therefore rotates with the opposite hub 168. This short hub 174 is provided with a series of longitudinal passage-ways 244 which correspond exactly with the passage-ways 180 in the hollow shaft 178, so as to provide continuous oil passages. In order to effect a perfect registration of the ports 180 and the ports 244 in the hollow shaft 178 and in the hollow sleeve 174, we countersink each of these longitudinal ports at their junctions and fit into said joint countersink portions a ground hollow ring 246.

The face of the hollow sleeve or hub 174 is provided with a valve seat disc 175 shown in detail in Figs. 38, 39 and 40. This disc is riveted to the sleeve 174 as at 177 and is provided with a central partition 179 through which the shaft 318 passes and is likewise provided with a plurality of spaced-apart circular recesses 181 having restricted ports 183 preferably of the construction illustrated in the drawings. In addition to the passage 274, the body of the backwash valve 264 is provided with a plurality of spaced-apart, preferably circular passageways 277 which pass completely through the face portion of the backwash valve. One of the ports 277 is provided with a radial slit 310 hereinafter to be described.

*The backwash valve*

In order to discharge the liquid which has passed through the filters and is passing through the longitudinal passages 180 lengthwise of the hollow shaft 178 and through the registering passages 244 of the registering hub 174, we provide a backwash valve casing 248 which as shown in Fig. 6, is disposed at the end of the filter. The details of construction of this backwash valve and the casing are shown in Figs. 11 to 14 and 35 to 37 inclusive. This casing 248 includes flanges 250 which are attached by bolts 252 to the hub portion 25 of the filter casing. The casing is provided with an internal partition 254 providing a communicating chamber 256 and also providing a chamber 258 into which the oil flows from the passages 244 leading from the filter. In addition, the walls adjacent to the partition 254 provide a passageway 260 communicating with the chamber 256 and the end of this passageway 260 is provided with a detachable ring 262 to which is soldered or otherwise affixed one end of a metallic bellows or sylphon 264 through which oil from the chamber 256 will flow after passing through the chamber 260.

The opposite end of this sylphon or bellows 264 is attached, or otherwise affixed, to a shiftable backwash valve 266 having a central fluid passageway 272 communicating on one hand with the interior of the sylphon and on the other with a radially extending passage 274.

Referring to Figs. 41 and 44, the disc shown in

Fig. 41 is riveted directly to the face of the construction shown in Fig. 44, i. e., Fig. 41 will be superimposed directly on Fig. 44.

The backwash, in addition to the passage 274, is provided with a plurality of spaced-apart, preferably circular passageways 277 which pass completely through the face portion of the backwash valve. The valve disc is provided with a plurality of circular passages or holes 279 which pass all the way through this disc and are adapted to register with the holes 277 in the backwash valve. In addition, these holes communicate with one another by means of a recess or groove 281 somewhat in the shape of a horse shoe, as particularly shown in Fig. 41. In addition, this disc 273 is provided with a port 283, which, on its reverse face, connects with a circular slot or recess 285 on the opposite face of the disc, and which circular slot or recess 285 in turn communicates with the passage 274. These slots 283—285 are the backwashing slots.

With references to Figs. 38 to 45 inclusive, and particularly to Figs. 6, 11, and 38 to 45 of the drawings, the filtered oil will pass through the ports 180, thence through ports 244 of the hub, thence through ports 183 with the exception of that port 183 which is lowermost in Fig. 38. The oil flowing through the other five ports 183 will thence pass into circular groove 281, thence through ports 279 thereof, and thence through registering ports 277 (see Fig. 44), which pass clear through the body of the backwash valve to discharge the filtered oil into the compartment 258 (see Fig. 11) of the backwash valve body. While this is occurring, backwash oil will be pumped through the sylphon, thence through the central port 272 of the backwash valve, thence through the radial port 274 (see Figs. 11 and 44) from which point it will pass through circular port 285 (see Fig. 43) and thence through communicating port 283 (see Figs. 43 and 41), and thence through the lowermost port 183 (see Fig. 38) of the hub disc facing 175, and thence through the lowermost port 244 (see Fig. 6), and thence through the lowermost filter section, but in the reverse or backwashing direction, which will result in the backwash oil being deposited within the interior of the filter, as hereinafter described. Inasmuch as the filter and the hub 174 and the passage 244 are slowly and continuously revolving with respect to the non-rotary backwash valve, the situation is continually changing, but during any particular moment, each filter section and its corresponding passage 244 is filtering for approximately ⅚ of a revolution of the entire filter, and there is a continuous and simultaneous backwashing operation going on for a short period. The horse shoe shaped recess or groove 281 into which the various ports 183 connecting with the filtering passages 244 empty, serves to provide a continuous flow of oil since each one of the ports 183 discharges into such groove, and since the circular ports 279 of the groove continuously discharge through the registering circular ports 277 directly through the body of the backwash valve, hence in any particular position of one of the ports 183, when it is communicating with the horse shoe-like groove 281, there will be a continuous discharge of fluid throughout the arcuate extent of this groove 281. This backwash valve 270 is likewise provided with an oppositely extending port 278 which is adapted to register sequentially with the six ports 244 as the filter revolves.

Figure 13:
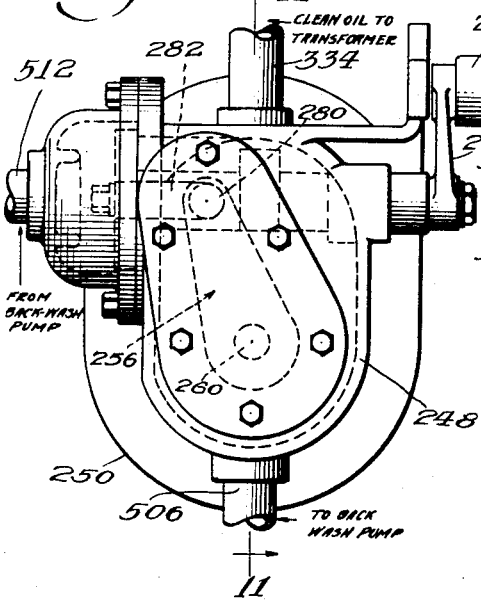
Fig. 13 is an end view of the automatic backwash valve.

Referring to Figs. 11 and 13, the oil is fed to the chamber 256 of the backwash valve by means of a conduit 280 connecting by means of a passage 282 which communicates with port 283 in casing 248, with which is associated a valve disc 286. The ported valve disc 286 is carried on a shaft 288 having a square portion 290 whereby to turn the disc with the shaft. The shaft 288 extends through the casing and is mounted in a bore 292. On shaft 288 is mounted a cam 294 and the lever 296 on which is mounted a handle 298. The cam 294 is so arranged that it comes in contact with the lever 300 which is mounted on a pivot 302. This lever 300 has forked arms 304 which have slots 306. These slots 306 engage two pins 308 which are fastened in the valve 270. On lever 300 is provided a projecting finger 310 which engages a slot 312 in valve disc 264, the purpose of this arrangement being to keep the valve 266 in an upright position at all times. Valve 266 is provided with a plate 314 having ground faces 316 which provide an oil-tight seal. Valve 266 is provided with a slidable pin 318 which is arranged to telescope within the hub 174 so as to provide a centering pin to keep the valve 266 in a central position with respect to the rotating hub 174 while permitting the valve to move slightly toward and away from the hub 174. Lever 300 is provided with a projecting pin 320 which engages a spring 322 which, in turn, is inserted into a recess 324 in the casing 146. The purpose of this spring is to exert a pressure normally on lever 300 which in turn keeps the backwash valve 266 tightly against the facing 175. Referring to Fig. 14 the disc 286 is provided with a spring 326 which enters a depression 328 in the casing 290. The purpose of this spring is to keep the valve 286 tightly against the face 330. On the shaft 288 is the arm 296 and the handle 298. This handle is provided with a centering pin as shown at 332 for the purpose of holding the valve 286 in either one of two positions.

Referring to Fig. 4 and also to Figs. 11 to 14, 35 to 37, inclusive, which shows the pipe connections from the filter to the backwash valve and from the backwash valve to the other elements of the system, it will be noted that oil that has been filtered and passes through the passages 180 and 244 in the hollow shaft and registering hubs, will thence pass into the chamber 258 of the backwash valve casing and will thence pass out through pipe 334 to the line pipe, thence through the sight-glass and back to the transformer. This line completes the filtered oil circuit.

*The differential pressure valve*

Referring now to Fig. 4 and Figs. 15 and 16, it will be noted that at the right hand side of Fig. 4, attached to the differential pressure casing is a differential pressure valve 144. This valve is preferably a cylindrical casing having a lateral plate 334 having holes 336 by which it is adapted to bolt to the filter casing 146. The cylindrical barrel or casing of the differential pressure valve 144 is provided at one end with a threaded opening 338 in which is mounted a threaded block 340 having a central bore carrying a screw shank 342 having an inner head 344 having a recess in which one end of a coiled spring 346 is seated. The screw rod 342 is provided with a nut 348 to permit the adjustment of the head 344 whereby to vary the tension of the spring. A suitable cap 350 closes over the adjusting screw and threads onto the outer end of the block 340. The cylindrical casing 144 provides a central chamber 352 into which the oil is adapted to be pumped through a pipe 142 connecting with the dehydrator. In addition, the central chamber 352 is provided with a discharge opening 356 in which threads a nozzle 358. This nozzle carries a loaded valve 360 normally closed by means of a spring 362. The nozzle 358 discharges into the filter case. The object of the small spring-loaded valve is to create a differential pressure of approximately 5 pounds greater pressure in the pressure valve casing chamber 352 than in the filter case, so that separate small lines hereinafter described can be run to each bearing in the case and properly lubricate it, as well as keep it washed free of all pre-coat material, by forcing a small quantity of oil through the bearings and into the filter case due to this differential pressure. Inasmuch as it requires a certain predetermined pressure on the oil to force the oil through the capillary passages in the filter, which for practical purposes is substantially 10 pounds, the pressure in the filter case correspondingly is 10 pounds. To force oil through pipe 142 into the differential valve casing chamber 352 and from thence past the spring loaded valve 360 into the pressure chamber will require a pressure which is 10 pounds plus the strength of the spring 362, or a total pressure in excess of 10 pounds. Hence oil is under pressure in excess of 10 pounds in the pressure chamber 352. A pipe 364 connects with this pressure chamber and this pipe as shown in Fig. 6 of the drawings connects with an angular groove 366 located between the oil-containing filter casing and the rotatable bearings and the hub 174. The purpose of this connection is to force dehydrated oil under pressure in excess of 10 pounds to this oil groove and any oil which escapes will flow from this groove inwardly to the filter chamber so that any oil within the filter chamber which is at 10 pounds and which may contain pre-coating will not flow to the bearings and hence will prevent the bearings from being cut by the pre-coat. The differential pressure cylinder 144 at the end opposite to that which contains the adjusting screw 342 is provided with an extended bore in which is mounted the free piston 368. This piston is provided with a projection 372 preferably in the form of a cross so as to prevent the piston from entirely closing a pipe 374 connecting with the backwash pump. At this end the cylinder is extended laterally as at 376 to provide ample room for the flow of oil around and about the extension 372. In addition, adjacent the end of the cylinder which connects with the pipe 374, the cylinder is provided with a port connecting with a by-pass pipe 378 which, in turn, connects with a pipe 380 leading back to the suction line of the backwash pump 382.

*Recirculating valve*

As shown in Figs. 4, 20 and 21, a recirculating valve is connected up with the clean oil line leading to the filter discharge and also with the clean oil line leading back to the transformer and also with an oil line leading back to the heater. As shown in Figs. 20 and 21, it comprises a valve casing 384 with a cover 386 in which is mounted a shaft 388 having thereon a handle 390. Shaft 388 at one end has a square portion 392 in which is inserted a valve disc 394 having two ports 396 at 180° or diametrally opposed to each other. These ports are adapted to register with two parts formed in the base 384 of the valve, one of such ports being port 398 connecting with the pipe 406 leading to the transformer and the other port being port 400 connecting with pipe 408 leading to the heater. Pipe 334 which connects with the clean oil coming from the filter is in constant communication with the interior of the valve casing. The valve handle is provided with a spring operated detent 402 adapted to operate in notches on a quadrum 404 whereby to hold the valve lever in shifted position. Hence, by shifting the valve from either discharging or recirculating position, the clean oil coming from the filter will be discharged either to the transformer through line 406 or will be returned through line 408 to the heater for recirculation.

*Drain valve*

Referring to Figs. 4 and 18 and 19, there is also provided a drain valve adapted for use when it is desired to drain the bottom of the filter chamber or the agitator chamber, as when it is desired to add filter-aid material to the chamber 152. This valve comprises a base 410 on which is mounted a casing 412 carrying a turnable shaft 414 operated by a lever 416. This shaft has an angular portion 418 to which is affixed a valve disc 420 having radially extending ports 422 and 424 which radially extending ports communicate with the periphery of the valve and with an internal recess 426 formed in the upper surface of the valve. The valve casing 412 carries two pipes, one of them (428) connecting with a pipe 430 having its end extending into the agitator chamber 152 and curving downwardly and terminating substantially adjacent the bottom portion of the agitator chamber as shown in dotted lines of Fig. 6 of the drawings and shown rather diagrammatically in Fig. 5 of the drawings. The other pipe 432 connects with the bottom of the sludge pan chamber as shown in Fig. 5 of the drawings. In addition, the base plate 410 is provided with a connection with a pipe 434 leading back to the sump of the dehydrator. This pipe 434 in its opening through the basal plate connects to a port 436 formed in the base plate 410. In addition, the valve disc 420 is provided with two ports 438 and 440 which extend transversely therethrough and which communicate with the central recess 426 above the valve disc. In the position shown in Fig. 19, the valve is in such position that there is no liquid now flowing through the valve. By moving the lever 416 to the position shown as "draining agitator compartment", the liquid will then flow through pipe 428 into port 422 into the central recess 426, thence through port 438 into pipe 434. On the contrary, when the lever is thrown to the "drain filter case" position, oil will flow from pipe 428 to port 422, thence into recess 426, thence through pipe 434 to dehydrator sump.

When it is desired to remove the sludge pan for dumping it the oil in this compartment is drained out by moving the lever 416 on the drain valve to "drain filter case" position, it being understood that it is necessary to have a vacuum in the dehydrator casing before starting this operation in order to remove the oil from the filter or agitator case to the dehydrator case. This operation should preferably be done immediately after shutting down the machine. After the oil has been removed from the filter case, the cover should be removed and the sludge pan pulled out. To drain the agitator compartment of the filter case, move the lever to "drain agitator" position, then the vacuum in the dehydrator chamber will pull oil into the dehydrating chamber sump. To drain the filter compartment of the filter case, move the lever to "drain filter case" position.

In other words, the drain valve is arranged in one position to drain the agitator compartment and in the other position to drain the filter case compartment, and in a third position or neutral position, it is disconnected from either draining operation.

Pump mechanism

Reference should be made to Figs. 4, 17, 28, 29, 30, 31 and 32 of the drawings for the pump mechanism. The pump mechanism is arranged to draw the dirty oil from the transformer and heater and to pass it into the dehydrator at a constant uniform flow of a definite number of gallons of oil per minute. In addition, the pumping mechanism must also draw the dehydrated oil out of the dehydrator which is under a high vacuum, and pass it to the filtering mechanism. Further, the pumping mechanism must pass clean oil to the filter for the backwashing operation. In the drawings the pumping mechanism to accomplish these functions, is preferably mounted on the bottom part of the dehydrator sump and preferably comprises four pairs of rotary gears mounted upon a single motor driven shaft. Two pairs of these gears comprise the two-stage dehydrator pump.

Two-stage dehydrator pump

Mounted on a flange 442 of the dehydrator sump bowl 122, is a gear casing 444 for this dehydrator pump for drawing the dehydrated oil from the dehydrator vacuum chamber, which itself is under a high degree of vacuum, and forcing said liquid to the inlet port 142 of a differential pressure valve which discharges through valve port 356 into the filter casing. The pump casing 444 is bolted to the sump flange 442 by means of bolts 446. In addition, this casing 444 includes a cover plate 448 bolted to the inside portion of the dehydrator sump bowl. This coverplate 448 provides a bearing 450 for the power driven pump shaft 130 hereinbefore described. The casing member 448 is provided with a lateral sleeve 452 externally threaded to receive a nut 454 operative to position the bevel gear 128. The casing portion 444 provides a bearing for a shaft 456 on which is rigidly mounted a gear 458 meshing with another gear 460 which latter is rigidly mounted on drive shaft 130. Also mounted in the casing 444 is another gear 462 mounted directly on the power drive shaft 130 and rotating therewith. This gear meshes with still another gear 464 on a stub shaft 466 in turn rotatably mounted on an extension of the casing member 444. By referring to Fig. 17 of the drawings it will be noticed that the first set of gears 458 and 460 of this dehydrator pump are submerged in the oil of the sump bowl so that there is a head of oil above it on the suction side of these gears 458 and 460 and also that we have eliminated any inlet conduit to the suction side of the pump, wherefor and consequently we have eliminated liquid friction on this side of the pump.

By referring to Fig. 29 of the drawings it will be noted that the casing members forming the liquid carrying passages for the first set of gears 458 and 460 surround or enclose substantially only one-quarter of the circumference of the gears; in other words, fully one-half of the lower circumference of these gears is open to the liquid head of the oil in the dehydrator sump. That is, the entire lower circumferences of these two gears lie or are submerged in the dehydrator sump and the casing portions extend upwardly and surround them for only one-quarter of their circumference. Bearing in mind that these rotary pumps are operated at high speeds,—say from 1,000 to 1,500 or 1,800 R. P. M., the gears are rotating at such a high rate of speed that they not only tend to act as agitators of the oil, thus creating liquid turbulence and preventing effective filling of the interdental spaces, but by reason of these high rates of revolution, a short time interval is allowed in which to fill these interdental spaces. Because of these factors, it becomes a very difficult matter efficiently and properly to remove oil out of an oil container which is under a high degree of vacuum. In our pump the arrangement is such that the teeth submerged in the oil and with the pressure of the head of oil upon them, are exposed to the filling operation for about 100 to 180° of their revolution. This is accomplished by beginning the casing wall at point 472 and 474 so as to give the teeth a full substantial 100° of filling travel in contact with the oil. Hence, by increasing the exposure for filling, we increase materially the time allowed for the teeth to fill.

These gears 458 and 460 are adapted to discharge the oil upwardly diagonally through channel 476 and thence over a dam 468 into a chamber 478. From this chamber 478 the feed of the oil is downwardly by gravity. By referring to the first stage of this dehydrator pump, by increasing the length of travel or exposure of the teeth to the filling operation, we have consequently reduced the seal which will hold pressure and hence a single unit as just hereinbefore described, will not be an efficient pressure pump because of the shortage of seal between suction and pressure. Hence, the second stage of the dehydrator pump. The first unit submerged in liquid in my vacuum chamber delivers its oil to the suction side of this second stage by means of proper porting of the housing and this second stage is so diagonally arranged and is so associated with the dam 468 and the reversed downward feed that it provides a liquid seal capable of pumping against high pressure. This second rotary unit has a capacity slightly in excess of the first stage so that it has a tendency to pull a vacuum on the first unit.

It will be noted that the second set of gears 462 and 464 are located on the reverse side of the drive shaft 130 and are hence driven in the opposite directions to the first set of gears. It will also be noticed that by means of our arrangement, the oil is fed by gravity or by the head of oil to the first set of gears, is forced upwardly over the dam 468, thereby to provide a further head of oil and consequently an oil seal and gravity feed. The gears 462 and 464 forming a second stage of the dehydrator pump, discharge into the chamber 480 which in turn discharges to pipe 142 leading to pipe 356 of the differential pressure valve shown in Fig. 15.

Pump feed to the dehydrator vacuum chamber

In any continuous liquid treating process where high vacuum is used and where it is desired to regulate the quantity treated per unit of time, means must be provided for controlling the flow of liquid into the vacuum chamber. In installations where the liquid treated is easily effected by dirt and changes in viscosity or consistency of liquid, such as oil and the like, a constant orifice inlet to the vacuum chamber would not be practical; likewise a float controlled valve for this inlet flow would not give a constant throughput. In order to provide for the regulation of the quantity of liquid flowing into the vacuum chamber of the dehydrator per unit of time, we provide means, in the present instance, preferably an additional pair of rotary gears, which while appearing to act in the capacity of a pump, really serve as a meter. This pair of gears is driven by the same shaft as drives the two stages of the dehydrator pump. This metering device of the pumping mechanism is shown in Figs. 17, 28, and 30, and comprises a casing 482 adapted to be bolted or otherwise fixed to the casing of the two-stage pump hereinbefore mentioned. This casing includes cooperative casing 484 bolted to casing 482 and enclosing a pinion 486 on shaft 488 and meshing with a pinion 490 fixed to the pump drive shaft 130. The casing is arranged to provide an inlet chamber 492 to which is connected pipe 42 leading to the heater and also to provide an outlet chamber 494 adapted to receive the discharge from the gears and which outlet chamber is connected by means of pipe 48 to the upper nozzle 64 which is adapted to discharge oil into the dehydrator shown in Fig. 17. In view of the high degree of vacuum within the dehydrator there is no need of a pump to introduce the oil into the vacuum chamber because the vacuum therein is sufficient to lift oil 20 ft. or so. In reality it is necessary to control the flow of oil into the vacuum chamber to provide a continuous constant rate of flow and we accomplish this by driving the gears 486 and 490 at a continuous uniform speed and to form the gears so as to provide a flow of a predetermined quantity of liquid per hour through the pipe 48 and discharge it into the dehydrating chamber.

From the above description it will be plain that there is a definite displacement relationship existing between the three elements of our pump as above described. Assuming that the gears 486 and 490 admit one gallon of liquid per minute into the vacuum chamber, gears 458 and 460 forming the first stage of the dehydrator pump are provided with a factor of safety over the gallons per minute in displacement so as to guarantee drainage of the vacuum chamber. We prefer to use a 20 to 25% factor of safety, therefore the first stage of the dehydrator pump formed by the gears 458 and 460 has a pump capacity of 1.25 G. P. M., the second stage of the dehydrator pump formed by the gears 462 and 464 have a displacement greater than the first stage in order to guarantee that there will be no liquid lock between the first and second stages. We prefer to use 20 to 25% factor of safety and therefore the second stage of the dehydrator pump has a capacity of 1.5 gallons per minute. By the above displacement or capacity relationship between the three different sets of rotating gears driven from the common power shaft, we insure a constant flow through the vacuum chamber and also insure a constant liquid level in the vacuum chamber and a constant removal of liquid from the vacuum chamber.

The backwash pump

The last pump of this series comprises a casing 496 suitably bolted to casing 484 and arranged to enclose a gear 498 on the shaft 500 and a gear 502 affixed to the pump drive shaft 130. These gears are arranged to provide an inlet chamber 504 connecting to pipe 380 coming from either the backwash by-pass or from the clean oil discharge pipe 506 of the backwash valve casing as shown in Fig. 11. In addition, the gears discharge into chamber 508 discharging into pipe 510 leading to either the inlet side 512 of the backwash valve for which see Figs. 13 and 14, or to the pipe 374 leading to the differential pressure valve as shown in Fig. 15. This last pump is the backwashing oil pump. By referring to Figs. 4 and 17 it will be noted that the drive shaft is provided with a series of pulleys 514 having belts 516 leading to a pulley 518 on the vacuum pump hereinafter described and to the pulleys 157 and 242 which are adapted to the agitator mechanism and the filter drive mechanism respectively. As shown clearly in Fig. 1 of the drawings, the pump drive shaft 130 and the shafts for the vacuum pump, the agitator and the filtering mechanism are arranged parallel with their ends adjacent one another so as to accommodate suitable belts for drivingly interconnecting these respective pulleys. By means of this arrangement it will be noted that the motor 132 operates the several pumps and by the belt connections actuates the agitator and the revolving filter discs, and furthermore, the centrifuging discs within the dehydrator, being driven by means of the pump shaft, are necessarily and inherently actuated at the same relative speed as are the various pumps.

The filter casing as shown in Fig. 5 is provided at 520 with an opening immediately above the agitator compartment through which the filter-aid material, or pre-coat, is adapted to be deposited. This filter-aid material is well known in the art, being somewhat inert material such as manufactured under the trade-name Supercell, and it is dumped right into the opening 520 and is put into suspension in the oil by means of the agitator paddles 154. The filter-aid being thus maintained in suspension, passes over the dam into the filtering compartment and is adapted to adhere and pre-coat the filters when filtration of switch oil is desired, all as will be hereinafter more fully set forth. The opening 520 is normally closed by a cover 522 held in position thereon by a suitable clamp or closure 524. In addition, the filter is equipped with a pressure gauge 526 for disclosing at all times what pressure is being maintained within the filter, and with a thermometer 528 and with a liquid level sight-glass 530 to which a relief cock 532 is attached to remove air from the filter case when filling the same. The oil passing from the filter flows to a sight-flow indicator glass 534 (see Fig. 4), which is provided with a sampling cock 536 for taking samples of oil for testing purposes, such as for dielectric strength. In addition, the clean oil flow line from the filter back to the transformer is equipped with a meter 538 for keeping accurate account of the clean oil flow back to the transformer.

By referring to Figs. 1, 2, 3 and 4, it will be observed that the entire device is so constructed that if desirable, it may be placed upon a single platform, such, for instance, as a portable platform, the arrangement being so that a single motor is adapted to actuate all driven parts. In addition, by the arrangement shown, the entire electrical equipment is controlled by a hand-operated electric controller 540 designed so that none of the electric heating units can be in operation while the pumps are idle, thereby preventing the possibility of permitting heat to be on which would cause burning or carbonization of the oil in the heating chamber. This electric controller is arranged to control the motors and the heaters, the first point of the switch controls the motor only; the second point controls the motor and one bank of heaters, and the third point controls the motor and the second bank of heaters, et cetera. By referring to the drawings it will be noted that all the manual controls are mounted on the same side of the machine and within easy reach of a single operator. These include the motor switch control 540, the backwash valve 298, the filter and agitator compartment drain valve 416 and the recirculating valve 390. In addition, the filter pressure gauge, the dehydrator gauge, all sight-flow glasses and thermometers and meter readings can be taken from this control position.

*Operation of the device for filtering*

When it is desired to filter transformer oil, the automatic backwash valve 298 is set in "transil oil" position and the recirculating valve 390 is set in "discharge" position. The connections to the machine are made to the transformer and the motor started and the desired number of heaters connected into the circuit for securing the correct temperature of the oil. In this situation the gears 486 and 490 will cause dirty oil from the transformer to pass through the heater and discharge in constant, measured, uniform flow into the inlet 64 at the top of the dehydrator whence the volatile moisture and impurities will be removed from the oil. The oil will then be drawn by means of the two-stage dehydrator pump and forced into port 354 of the differential pressure valve and thence past the spring-loaded valve 360 into the filter chamber. From this point the pressure in the filter chamber forces the dehydrated oil through the microscopic or capillary openings in the filter. It is to be borne in mind that the filter drums are continuously and slowly revolving within the filter casing and the longitudinal passages 244 in the revolving hub 174 through which the oil is being discharged from the filtering elements are revolving slowly and the oil is thence passed through ports 183 (see Fig. 38) of the hub disc 175 into the arcuate horse shoe-like groove 281 of the backwash valve disc 273 (see Fig. 41). When each port 183 during the revolution of this drum registers with the groove 281 in the backwash valve disc, the oil will be forced by the pressure in the filter chamber through the microscopic or capillary openings in that section of the filter which is connected to that port 183 which is registering with groove 281. Following this particular section for a rotation, it will be seen from Figs. 38 to 45 of the drawings, that this section will filter for substantially ⅚ of a revolution of the drum, at the end of which time its port 183 will cease to register with the groove 281 of the backwash valve, and filtering will then be cut off for that particular filter section. The drum continuing to revolve that particular section will be cut off for a short period of a revolution of the drum, at the end of which time such port 183 will then come into registration with backwash port 283 of the backwash valve (Figs. 41 and 43), at which time the backwashing operation for that particular section will take place for a short part of an arcuate revolution of the drum, at the termination of which time the port 183 will come out of registration with port 283 of the backwash valve, and backwashing will cease, and that particular filter section will then remain cut off for a short part of a revolution more of the drum at the end of which time such particular port 183 will again come into registration with the groove 281 of the backwash valve, at which time filtering will again be resumed.

Inasmuch as there are six of these ports 183, (see Fig. 38) and since the filtered oil from the filter is being pumped through five of these six ports 183, the lower-most port being reserved for backwashing, and since these ports 183 are slowly and continuously revolving and due to the fact that they discharge into the extending arcuately arranged groove 281, it will be seen that five of them will be simultaneously discharging into this arcuate groove 281 and the filtered oil therefrom will be forced through the registering circular grooves 279 and 277 to discharge into passage 258 interiorly of the backwash valve casing. The purpose of this circular groove 281 is to permit each filter section to continuously filter during approximately ⅚ of the revolution of the drum, and also to permit five of the radially extending filter sections to be filtering simultaneously and sequentially. By referring to Fig. 41, it will be noticed that during the travel shown by the marks X and Y, each particular port 183 corresponding to a filter section will be travelling in a cut-off relation so that no filtering or backwashing will be taking place. This condition represents a practical liquid seal between the pressed-together faces of the backwash valve, and the hub seat disc.

*Backwashing operation*

The backwashing operation is taking place simultaneously with the filtering operation. By referring to Figs. 5 and 6 it will be noted that the section which is in the lower-most position is being backwashed; all the other sections are in the filtering position. Upon rotation of the drum each section is consecutively backwashed and at the same time every other section is simultaneously filtering oil.

From the foregoing it will be seen that at all times ⅚ of the entire filter element is continuously passing filtered oil and that the other ⅙ of the element is being continuously backwashed with clean oil, which consequently frees the faces of the filter plates of sludge and sediment, and that the segments of the filter element being backwashed are in the bottom position which permits precipitation of the removed sediment.

In this slow rotation of the drum, each section as it approaches bottommost position has its port 183 connected with port 283 of the backwash valve, and the backwashing connections are automatically made for a short portion of the travel of this section at the end of which time such port connections are disconnected. After this, the backwashing connections for the next adjacent filter to reach backwashing position are made and backwashing continues in that next succeeding filter for parts of its rotation, after which backwashing connections are broken. In the backwashing operation, the backwash pump forces clean oil into port 512 of the backwash valve casing. From thence the oil will flow to port 280 and then to port 260 (see Figs. 11 to 14). From this point the oil will flow through the metallic bellows or sylphon connection 264, thence through the backwash valve proper, including the passages 268 and 274, thence to the longitudinal passages 244 in the hollow sleeve, and thence outwardly through the microscopic or capillary passages in the filter, whereby any deposit on the external surfaces of the filter will be removed by the backwashing and will be thrown downwardly into the filter chamber so that this dirty oil in the filter chamber can then be refiltered by means of the filtering operations that are taking place in the remaining sections of the filter. During this backwashing operation the oil that is aiding the backwashing is pumped in the reverse direction through the backwashing section of the filter at a higher pressure than that in the filter chamber which is forcing the oil in the ordinary filtering operation through the remaining filtering units. This differential or higher pressure is due to the differential pressure valve hereinbefore described.

During the turning movement of the filters there will be a short interval of time when the backwashing filter section is not in registration with the backwashing channels of the backwash valve and the hub of the hollow shaft with which it is adapted to register. In this position the backwash pump then by-passes the clean oil through pipe 374, through the end of the differential pressure valve, which will force piston 368 inwardly against the tension of the spring 23 and the pressure in the oil chamber 352 to open the by-pass port 378 whereby to permit this clean oil from the backwash pump to return to the backwash pump in a continuous cycle.

In order to force this piston in the differential pressure valve downwardly, the backwash pump must force the piston against the ten pounds of pressure in the internal chamber 352 of the backwash valve, plus the strength of the adjustable spring which in the present construction is about five pounds. Hence, when the piston is forced back, the backwash pump will by-pass the clean oil around the differential pressure valve and return to the backwash pump at a pressure of substantially fifteen pounds.

During this filtering and backwashing operation, the dehydrator pump is forcing oil through port 354 into the central chamber of the differential pressure valve and this oil is then forced out of pipe 160 against the spring-loaded valve 360 into the filtering chamber. The pressure required to force the dehydrated oil past valve 360 is in excess of ten pounds, the pressure in the filter casing, by an amount equal to the pressure of the spring 362, of valve 360, which latter is five pounds, so that the oil, in order to flow past valve 360 into the filter chamber, must have a pressure of about fifteen pounds. This is substantially the pressure in the differential pressure chamber casing 352. While oil is flowing past spring-valve 360, it is simultaneously being forced through pipe 364 at a pressure of fifteen pounds. This pipe 364 connects with the circular groove 366 in the bearing or any other point desired so as to lubricate this bearing and the flow of dehydrated oil at this point will be from the circular groove 366 inwardly, thereby preventing the flow of any oil in the filter casing outwardly toward the bearing, inasmuch as at certain times the oil contains the pre-coat or filter-aid and any flow from the filter casing outwardly would tend to wear and cut the bearings, hence by having the lubricant groove 366 at a higher pressure, to-wit, fifteen pounds, and the pressure of the oil in the filter casing, to-wit, ten pounds, all danger of cutting the bearings is eliminated.

*Reclamation of switch oil*

When treating switch oils, which in addition to other contaminating impurities, contain carbon deposits of microscopic dimensions, and so finely divided that some of it will pass through even the metal bars of the metal filter element, a pre-coat of porous filter-aid is introduced into the filtering compartment and applied to the filtering surfaces of the metal plates to insure positive removal of every trace of these injurious substances. During this process, filtration takes place through the entire filtering element, i. e., all six of the sections.

The automatic, continuous backwash feature of one of the filter sections is temporarily and automatically disengaged in order to preserve the filtered cake. In order to use the filter-aid preparation, it is desirable to drain the agitator case down about half-way. After this is done the filter-aid preparation such as high flow Supercell is introduced into the compartment through the opening 520, in the filter casing and the closure thereof is then replaced. The recirculating switch lever is now moved to recirculating position and the lever on the automatic backwash valve is moved to switch oil position and the machine started.

In this position the shifting of the control lever 298 has turned the disc valve 286 to shift its port out of registration with port 282 of the backwash valve and has shifted into registration with port 281 of the backwash valve. Simultaneously the entire backwash valve has been shifted axially away from the hollow rotating drum 174 with its oil passages, see Fig. 35. In this situation the clean oil, instead of being forced by the backwash pump through the sylphon connection 264 (see Figs. 11 to 14 inclusive) at 15 pounds (which is the usual backwashing procedure) the flow of oil through this connection is cut off. This is because the disc valve 286 operated by the backwash valve lever 298 has been turned to move its port out of registration with port 283 in the backwash valve casing so that the clean oil cannot now flow from pipe 512 from the backwash pump to port 282 to chamber 256 to port 260 and sylphon connection 264 to backwashing channels 244, then through filter, as in the backwashing operation. On the contrary, turning of the disc valve 286 makes connection between port 512 and the port in the disc 286 and port 281 of the backwash valve so that the clean oil from the backwash pump is discharged directly into the central chamber 258 of the backwash valve casing from which point it then circulates by pipe 506 back to the backwash pump and alternatively flows out of pipe 334 to the recirculating system, i. e., back to the recirculating valve and from thence back to the heater connection where it is recirculated through the system instead of being returned to the transformer. Simultaneously with this operation the dehydrator pump is forcing the oil in the filter casing and the pre-coat or filter-aid against all of the filter sections including that section which has previously been used for backwashing. In this operation, the oil containing the pre-coat will then flow through the filters from the discharge inwardly and will flow thence through the hollow central shaft and into the central chamber casing, the backwash valve itself having been shifted to open position as shown in Fig. 35 by movement of the control lever 298.

After operating for sufficient time to pre-coat the filter, the recirculating valve 390 is then shifted over to "discharging" position whereby oil instead of flowing from line 334 (see Fig. 4) back to the heater connection, will flow to the desired discharge point. In other words, the recirculating position of the lever is maintained and the oil is recirculated through the pre-coat on the filters until it comes clean in the sight-flow indicator after which the lever on the recirculation valve is moved to the discharging position, and the switch oil which is now filtering clean, will be discharged to the desired point instead of being recirculated.

After a continuous period of discharge operation, it will be noted that the pre-coat will become filled with sludge so that it will become necessary to remove it. To accomplish this, the recirculating valve is thrown back to recirculating position, thereby discontinuing the discharge of the filter switch oil preventing the further discharge of the inefficiently filtered oil to the desired point.

After recirculating for about five or ten minutes, the automatic backwash lever 298 is moved back to "transil oil" position and operation is continued in this position for about ten minutes, during which time all pre-coat will be removed by the automatic back-washing feature as each section of the filter is moved around into backwashing position. In this backwashing position the pre-coat or sludge on the outside of the filter will be precipitated into the sludge basin.

As hereinbefore stated, in order to remove the sludge and deposit from the sludge pan, it is necessary to shut down the machine and the agitator case should then be drained down about half-way by throwing the filter and agitator case drain valve 416 to "drain agitator case" position. A quantity of filter-aid should now be added to the agitator compartment so that filtration of switch oil can be resumed in the manner hereinbefore set forth.

If it be desirable to discontinue the filtration of switch oil and if it be desired to filter transil oil or transformer oil, it is first necessary to remove the pre-coat and all oil from the agitator case and filter casing. When filtering transformer oil, filter-aid is not used as no cake is necessary on the filtering discs for filtering this class of oil.

Our improved apparatus is highly advantageous in that it is not only complete and compact, but it automatically accomplishes full restoration of the dielectric properties to serviced transformer oil in one passage of the oil through the apparatus, without introducing into the oil any deleterious materials. It is also adaptable to the reclamation of circuit breaker oils, or switch oils, for the removal of water and gases resulting from arcing, and carbon. It is also adapted for use in removing gases and moisture from oils used in oil-filled cables.

Our improved device enables the maintenance of maximum dielectric strength and purity of insulating oils in a minimum of time, and at less expense. It makes the dehydration and filtration of insulating oils a very simple matter. In addition, our improved apparatus and method has the following advantages: It renders the oil anhydrous and of high dielectric strength in a single pass; it frees the oil of gases, including dissolved air and gases resulting from oxidization due to sludge reactions and from arcing; it reduces the remaining acid content of the serviced oil without introducing water or chemical solutions into the oil; it filters the oil through an all-metallic filter so that the filtered oil will contain no suspensions; it reduces the soluble and non-soluble sludges in the oil; it eliminates the contamination of the oil with atmospheric gases; it automatically and continuously backwashes the filtering element when reclaiming transformer oils, dislodging and removing the cake of impurities which accumulates during the filtering process; it provides a device in which, by the manipulation of one or two simple levers, the filtration of transformer oil may be discontinued and the apparatus immediately converted over to the filtration of switch oil; it provides means for converting filtering and simultaneous backwashing in the filter sections to a condition wherein only filtering is taking place in the sections; it provides means whereby the dirty oil discharged into the filter casing during the backwashing is subsequently filtered in this same filter casing and converted into clean oil, thereby eliminating the necessity of isolating the deposit or sludge precipitate from the filter section during the backwashing operation and thereby providing a practically continuous filtering operation of long duration and eliminating the necessity of shutting down the machine at short intervals to get rid of this backwashing sludge or precipitate.

Having thus fully described our invention, what we claim as new and desire to obtain by Letters Patent is:

1. In combination with a pump for pumping oil, oil filtering means connected thereto through which oil is adapted to be forced under pressure, a backwash pump, and a differential pressure valve comprising a casing having an inlet connection from the first mentioned pump and having a first outlet connection to the filter case, said outlet connection being controlled by a discharge valve adapted to be opened upon the creation of a fixed pressure in said casing, a piston operatively movable in said casing, adjustable spring means for normally moving the piston in one direction, the pressure of said spring means being constructed and arranged to be augmented by the pressure in said casing created in advance by said discharge valve, and by-pass connections from the backwash pump adapted to be covered and uncovered by means of the movement of said piston.

2. A casing having a filter therein, and a movable mechanism in said casing having a bearing, a differential pressure valve including a casing having a fluid discharge into said filter casing controlled by a spring-loaded valve whereby to create a higher pressure in said differential valve casing, than in said filter casing, and a fluid connection from said differential valve casing to the bearing in said filter casing whereby to prevent the passage of liquid in said filter casing to said bearing.

3. In a device of the class described, the combination of a casing, means for feeding oil under pressure into said casing, a rotatable hub mounted in said casing and having axially disposed spaced-apart oil passages, a filtering disc rigidly mounted on said hub for rotation, said disc having a plurality of independent radially extending filter sections, each having an internal passage communicating with one of said hub passages, a backwash valve disposed exteriorly of said casing and having a chamber connected to said main casing, a backwash valve having inlet and discharge passages, said inlet passage thereof connecting with the interior of said backwash valve casing, said discharge passage connecting with the interior of a flexible metallic bellows, said bellows in turn communicating with a liquid passage extending outside of said valve casing chamber, means for shifting said backwash valve toward and from said main casing whereby in one position to connect the port in said valve with the respective hub openings upon rotation of the hub, and in another position to break said connection, means for shifting the valve, and means for cutting off the passage of liquid through said metallic bellows, and means associated with said valve casing for passing liquid from the filter therethrough, and means associated with said metallic bellows for forcing liquid therethrough at a higher pressure and through one of said filter sections when the latter is moved to backwashing position.

4. In a device of the class described, the combination with a filter casing having a filter therein, means for forcing liquid through said filter at a predetermined period, and means for forcing liquid through said filter at a predetermined period to backwash said filter, a backwash pump, a connection from said pump to said filter for the backwashing operation, a differential pressure valve having a connection to the backwash pump, a piston in said differential pressure valve, a by-pass connection from said differential valve to the inlet side of the backwash pump, pressure operated means within said differential pressure valve for normally holding said piston to cover said by-pass, said piston yielding upon the occurrence of an excess pressure in said backwash line when the backwashing operation in said filter ceases.

5. In combination with a filter having a plurality of movable sections, a filter discharge and backwash inlet mechanism for said filter having ports adapted in certain positions of their relative movement to register to permit filtering and backwashing operations and adapted in other positions of their relative movement to be temporarily out of registration, a pump for forcing oil through the filtering mechanism when certain of said ports register, a differential pressure valve comprising a casing having an inlet connection from the pump and having an outlet connection to said discharge port of the filter mechanism, said outlet connection being controlled by a discharge valve adapted to be opened upon the creation of a fixed pressure in said casing, a backwash pump having its discharge connected to the backwash inlet mechanism and to a by-pass inlet in the differential pressure valve casing, a piston operatively movable in said casing, adjustable means for yieldably moving the piston in one direction, said means being augmented by the pressure created in said casing by the discharge valve, a by-pass port in said differential pressure valve casing and connected to the suction side of the backwash pump and normally covered by said piston, said piston being yieldable to uncover the by-pass port when the ports of the filter discharge backwash inlet mechanism move relatively out of registration whereby to permit said backwash pump to force fluid through the by-pass.

PAUL B. RENFREW.
RAYMOND W. BOND.